(12) United States Patent
Teranishi

(10) Patent No.: US 8,127,140 B2
(45) Date of Patent: Feb. 28, 2012

(54) GROUP SIGNATURE SCHEME

(75) Inventor: Isamu Teranishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1230 days.

(21) Appl. No.: 11/795,267

(22) PCT Filed: Dec. 13, 2005

(86) PCT No.: PCT/JP2005/022869

§ 371 (c)(1),
(2), (4) Date: Jul. 13, 2007

(87) PCT Pub. No.: WO2006/077700

PCT Pub. Date: Jul. 27, 2006

(65) Prior Publication Data

US 2008/0152130 A1    Jun. 26, 2008

(30) Foreign Application Priority Data

Jan. 21, 2005 (JP) .................................. 2005-014889

(51) Int. Cl.
*H04L 9/32* (2006.01)
(52) U.S. Cl. ............. 713/180; 380/28; 380/30; 713/176
(58) Field of Classification Search .................. 713/176, 713/168, 180, 181; 380/28, 282, 285, 30
See application file for complete search history.

(56) References Cited

U.S. PATENT DOCUMENTS

2002/0103999 A1    8/2002   Camnisch et al.
2005/0262353 A1*   11/2005   Gentry et al. ................. 713/176

FOREIGN PATENT DOCUMENTS

JP    2004-228958 A    8/2004
JP    2004-228958 A    8/2004

OTHER PUBLICATIONS

G. Anteniese et al., "Efficient Group Signatures Without Trapdoors," Advance in Cryptology, Asiacrypt 2003, vol. 2094 of LNCS, pp. 1-19, Springer-Verlag 2003.

(Continued)

Primary Examiner — Edward Zee
Assistant Examiner — Chi Nguy
(74) Attorney, Agent, or Firm — Foley & Lardner LLP

(57) ABSTRACT

An efficient and safe group signature scheme is provided. According to the present invention, an open unit is provided to not an issuer but an opener, and a data required for operating the open unit does not include a key pair of the issuer, so that it is possible to accurately operate the open unit even if the issuer generates the public key in an illegal manner. In addition, it is possible to prove that a key pair of a member cannot be counterfeited. It is possible to implement from a discrete logarithm assumption a feature that a cipher text, that is, a portion of a signature text can be decrypted only by the opener in a method which is the same as a method representing that an ElGamal crypto scheme is safe. In addition, it is possible to implement from a random oracle assumption a feature that a knowledge signature has an extractability in a method which is the same as a method proving that a Schnorr signature is safe.

10 Claims, 22 Drawing Sheets

OTHER PUBLICATIONS

G. Antienese et al., "A Practical and Provably Secure Coalition-Resistant Group Signature Scheme," In Advances in Crytology, Crypto 2000, vol. 1880 of LNCS, pp. 1-16, Springer-Verlag 2000.

D. Boneh et al., "Short Signatures Without Random Oracles," In Advances in Cryptology, Eurocrypt 2004, vol. 3027 of ¥emph[LNCS], pp. 1-18, Springer-Verlag 2004.

D. Boneh et al., "Short Group Signatures," Advances in Cryptology, Crypto 2004, vol. 2656 of LNCS, pp. 1-19, Springer-Verlag 2004.

F. Boudot, "Efficient Proofs that a Committed Number Lies in an Interval," In Eurocrypt 2000, LNCS vol. 1807, pp. 1-14, Springer-Verlag, 2000.

J. Camenisch et al., "Signature Schemes and Anonymous Credential from Bilinear Maps," Advances in Cryptology, Crypto 2004, vol. 2656 of LNCS, pp. 1-17, Springer-Verlag, 2004.

J. Camenisch et al., "Proving in ZXero-Knowledge that Number is the Product of Two Safe Primes," in Advances in Cryptology, Eurocrypt 1999, vol. 1592 of LNCS, pp. 1-22, Springer-Verlag, 1999.

A. Kiayias et al., "Group Signatures: Provable Security, Efficient Constructions and Anonymity from Trapdoor-Holders," http://eprint.iacr.org/2004/076.ps. pp. 1-31, 2004.

J. Kilian et al., "Identity Escrow," in Crypto 1998, LNCS 1462, pp. 1-23, Springer-Verlag, 1998.

L. Nguyen et al., "Efficient and Provably Secure Trapdoor-free Group Signature Schemes from Bilinear Pairings," in Advances in Cryptology, Asiacrypt 2004, vol. 2729 of LNCS, pp. 1-28, Springer-Verlag, 2004.

R. Pass, "On Deniability in the Common Reference String and Random Oracle Model," in Advances in Cryptology, Crypto 2003, vol. 2729 of LNCS, pp. 1-22, Springer-Verlag, 2003.

V. Shoup et al., "Securing Threshold Cryptosystems against Chosen Ciphertext Attack," in Advances in Cryptology, Eurocrypt 1998, vol. 1403 of ¥emph[LNCS], pp. 1-16, Springer-Verlag, 2004.

G. Anteniese et al., "Efficient Group Signatures Without Trapdoors," Advances in Cryptology: $9^{th}$ International Conference on the Theory and Application of Cryptoloty and Information Security, Asiacrypt•2003, LNCS 2894, pp. 246-268.

A. Menezes et al., Chapter 10: Identification and Entity Authentication, Handbook of Applied Cryptography, 1996, pp. 385-424.

G. Antienese et al., "A Practical and Provaby Secure Coalition-Resistant Group Signatue Scheme," Advances in Crytology, Crypto 2000, LNCS 1880, pp. 255-270.

Rafael Pass, On Deniability in the Common Reference String and Random Oracle Model, Advances in Cryptology—Crypto 2003, $23^{rd}$ Annual International Cryptology Conference, Aug. 2003, pp. 316-337.

\* cited by examiner

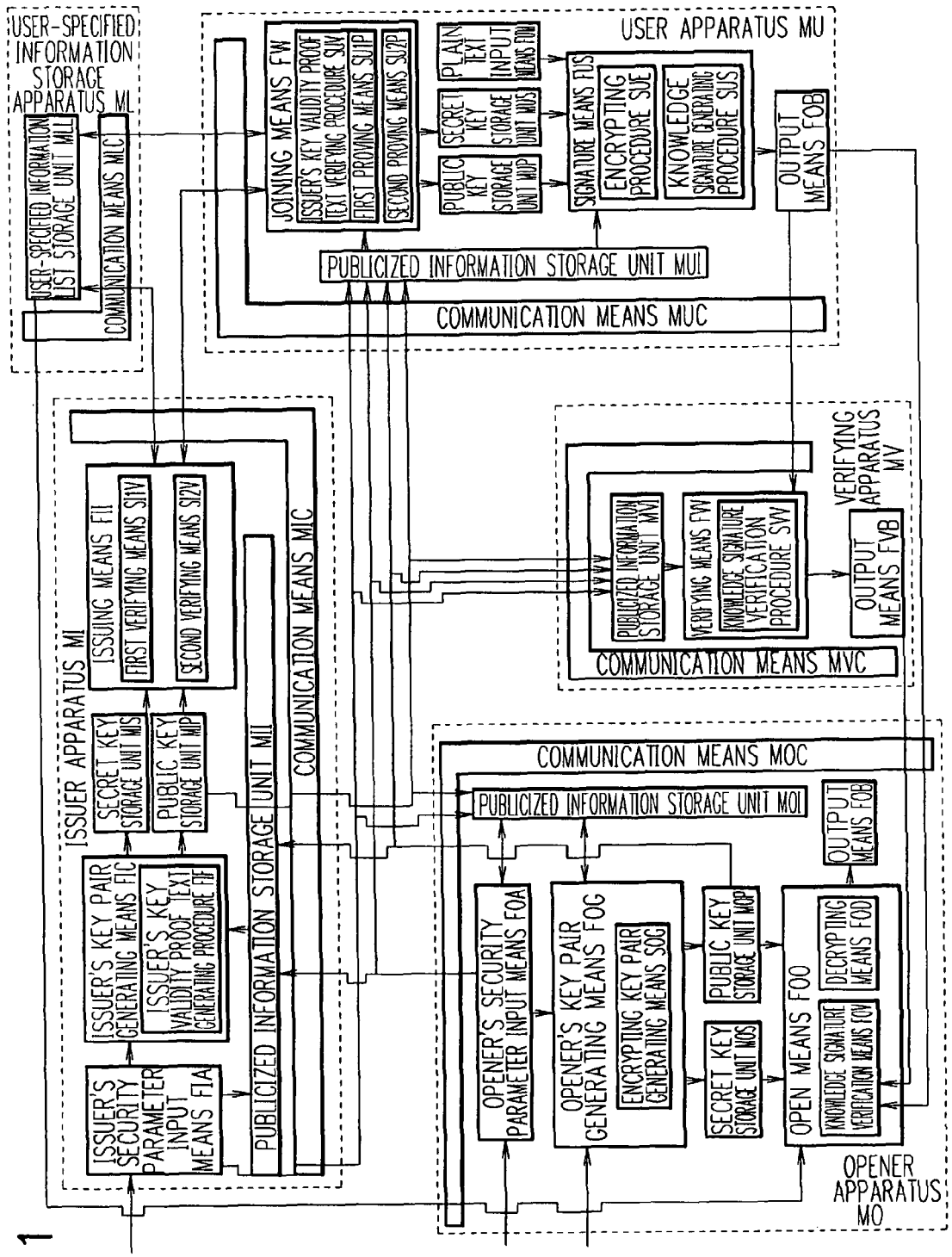
F I G. 1

F I G. 2
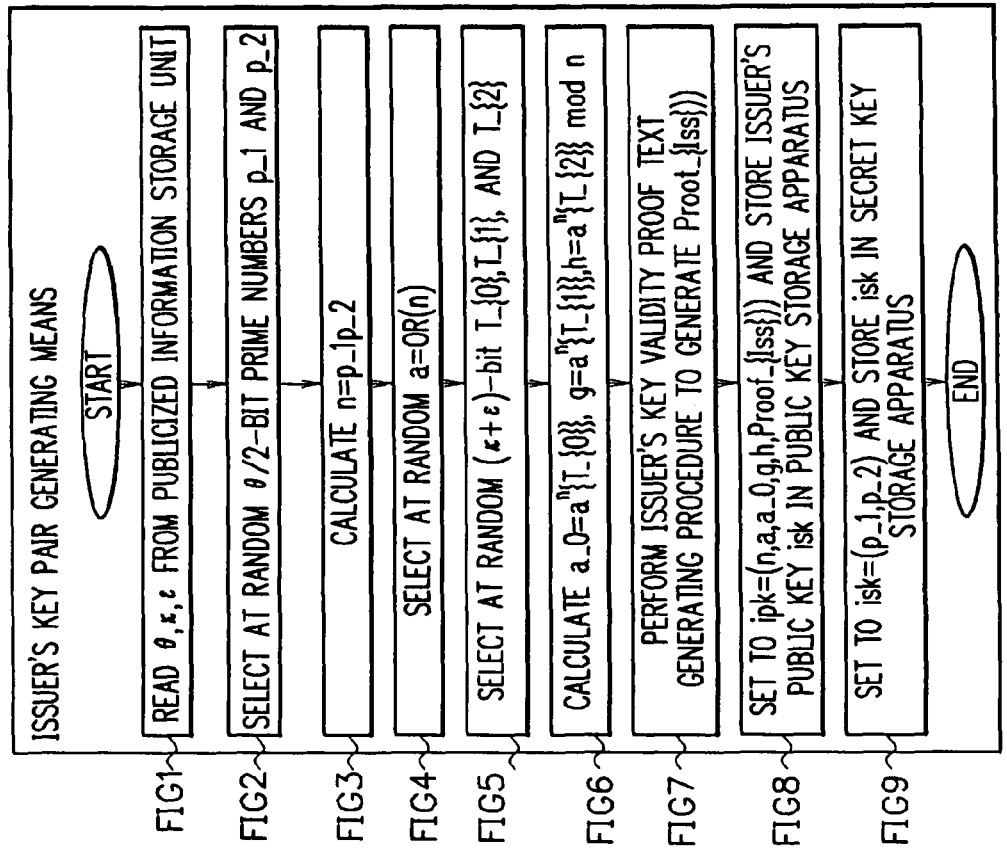
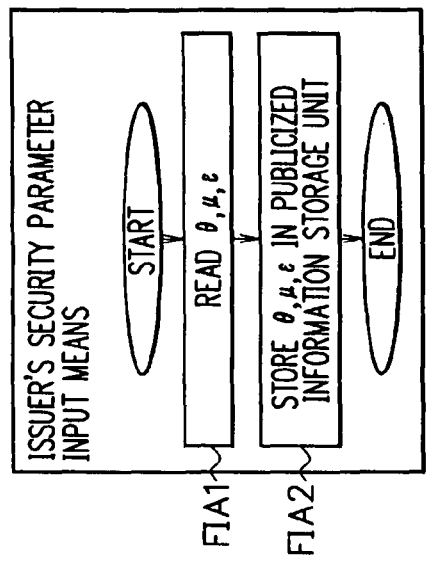

FIG. 9
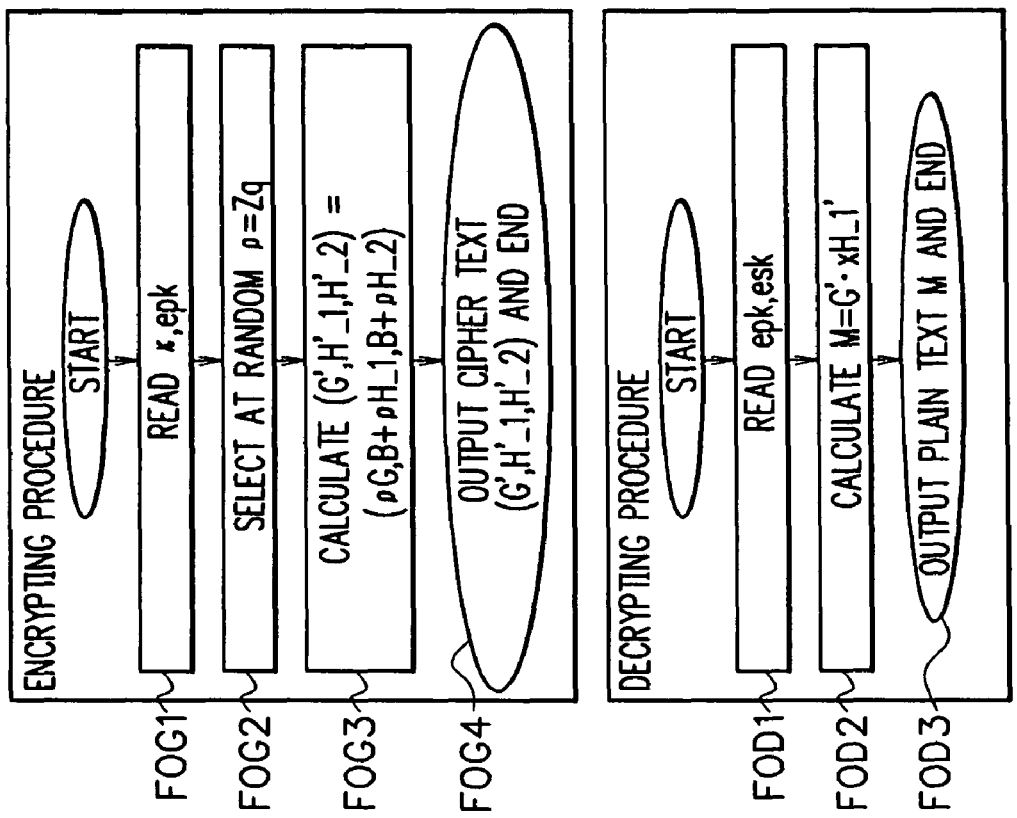
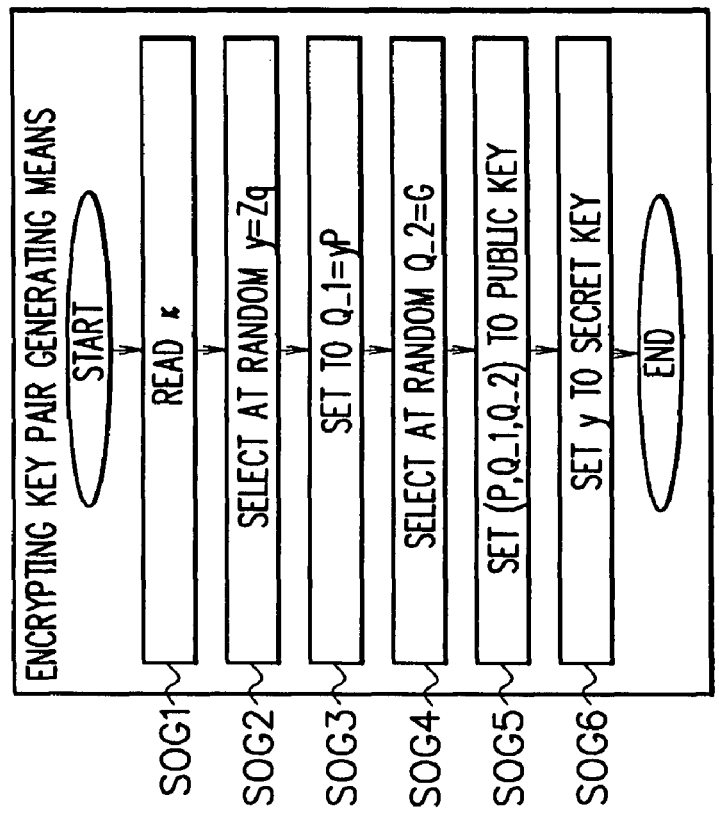

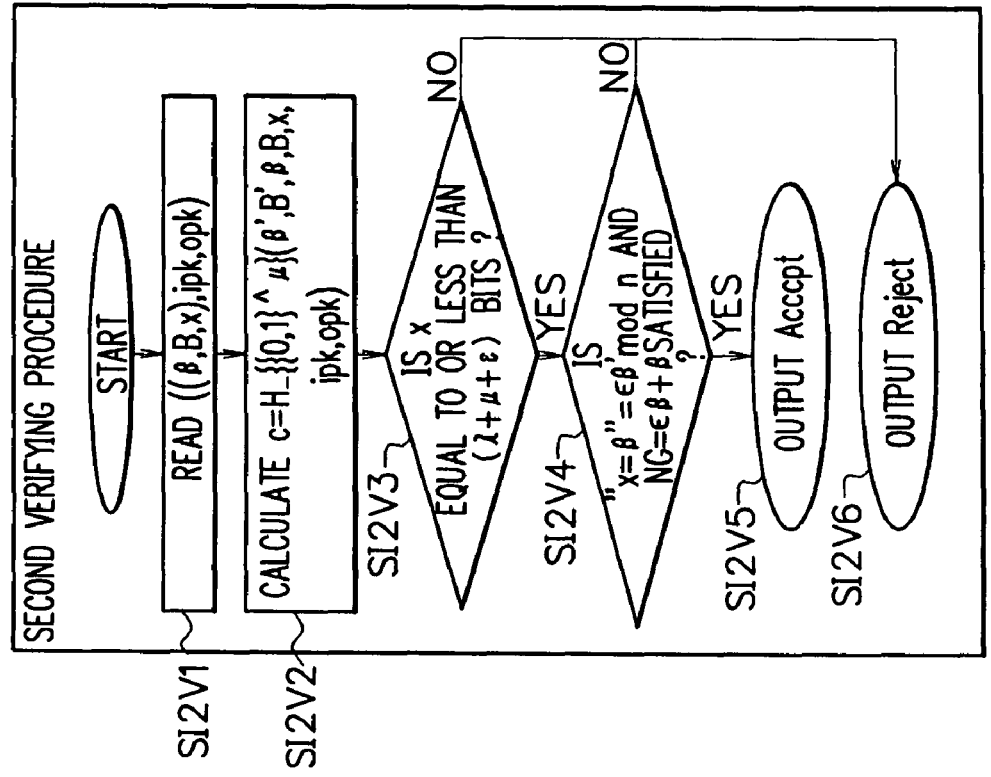
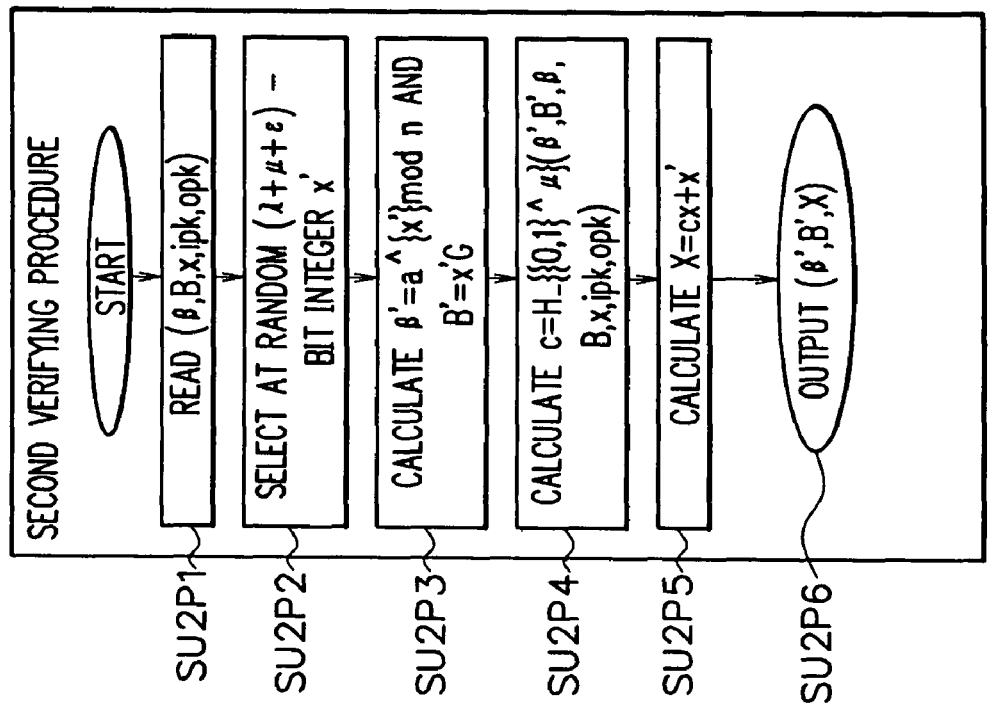
FIG. 15

FIG. 17
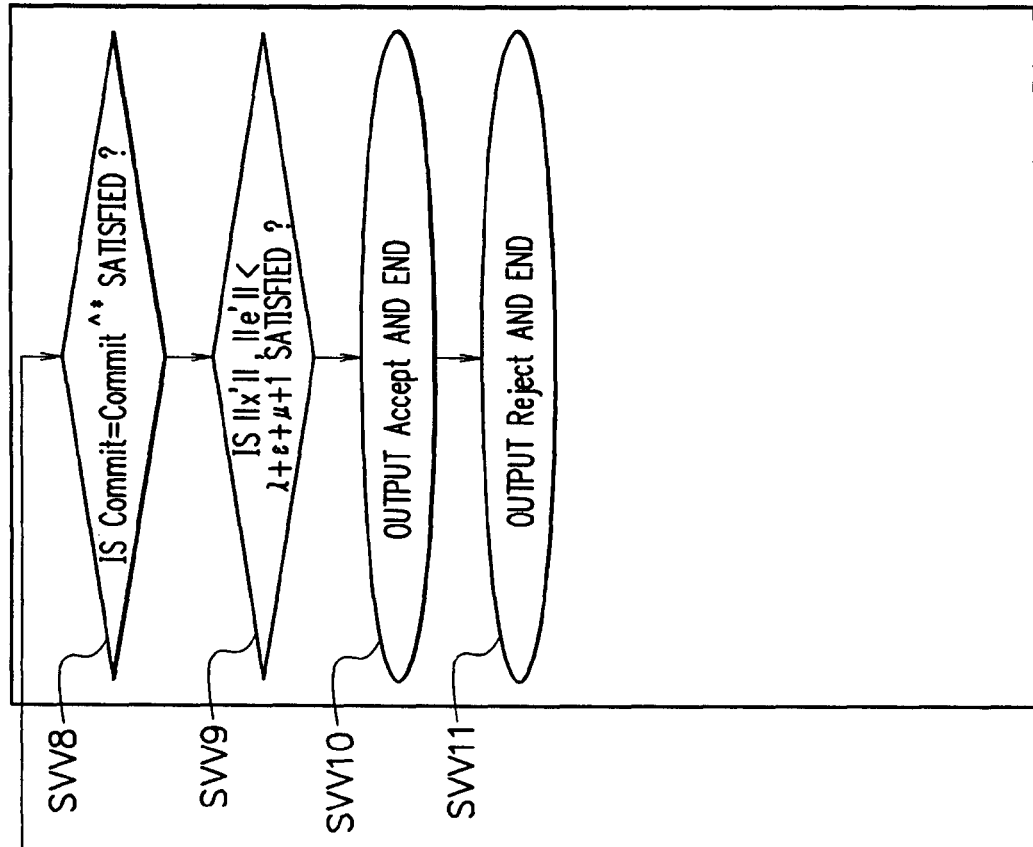
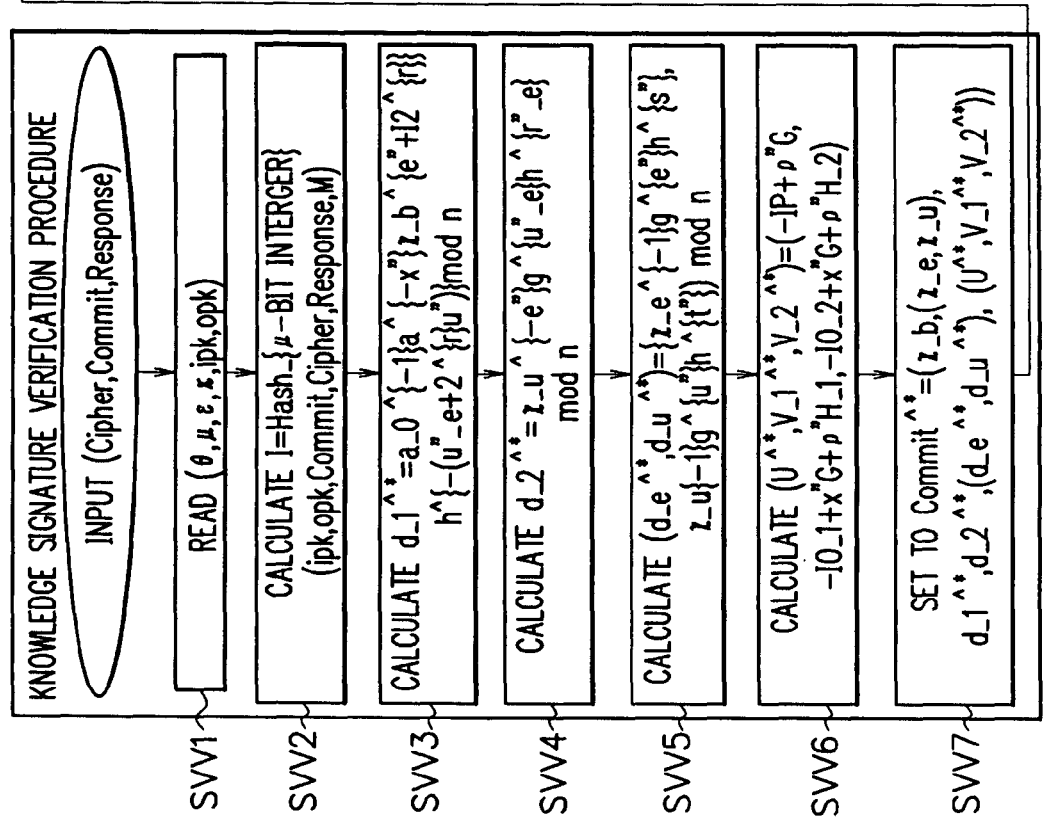

FIG. 18

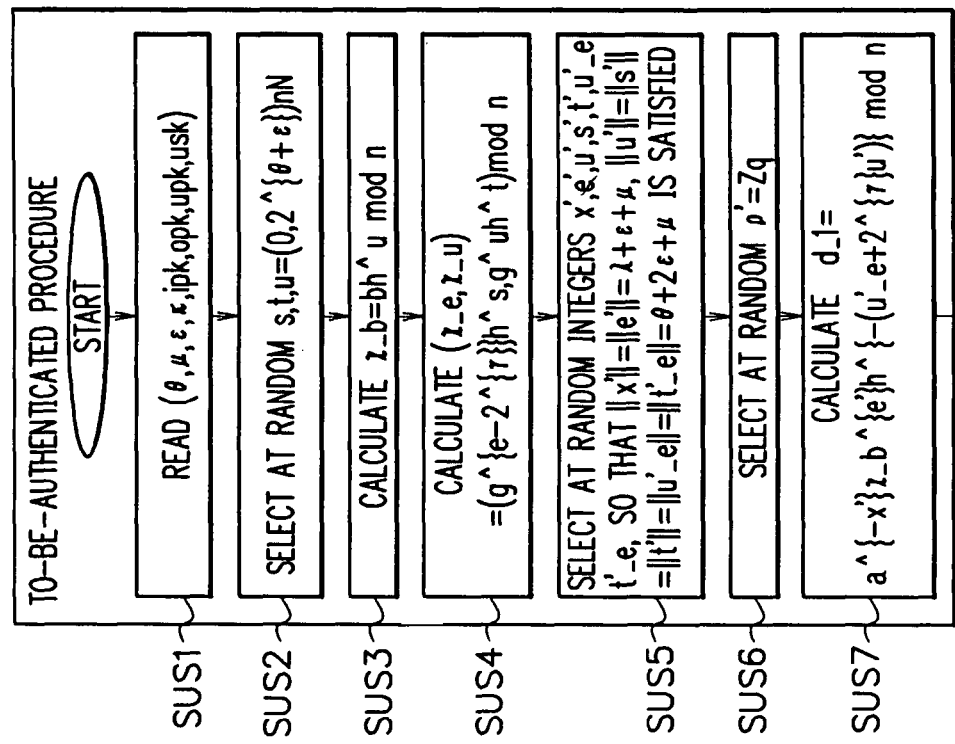

VERIFYING PROCEDURE

TO Fig19

TO-BE-AUTHENTICATED PROCEDURE

START

SUS1: READ ($\theta, \mu, \varepsilon, \varepsilon, ipk, opk, upk, usk$)

SUS2: SELECT AT RANDOM $s, t, u = (0, 2^{\{\theta+\varepsilon\}})$ⁿN

SUS3: CALCULATE $z\_b = bh^u \bmod n$

SUS4: CALCULATE ($z\_e, z\_u$)
$= (g^{\{e-2^{\{\tau\}}s\}}, g^u uh^t) \bmod n$

SUS5: SELECT AT RANDOM INTEGERS $x', e', u', s', t'\_e, t'\_u\_e$ SO THAT $||x'|| = ||e'|| = ||e'|| = \lambda + \varepsilon + \mu$, $||u'|| = ||s'|| = ||t'|| = ||u'\_e|| = ||t'\_e|| = \theta + 2\varepsilon + \mu$ IS SATISFIED SUS6: SELECT AT RANDOM $\rho' = Zq$ SUS7: CALCULATE $d\_1 = a^{\{-x'\}} z\_b^{\{e'\}} h^{\{-(u'\_e + 2^{\{\tau\}} u')\}} \bmod n$ TO Fig19

F I G. 22
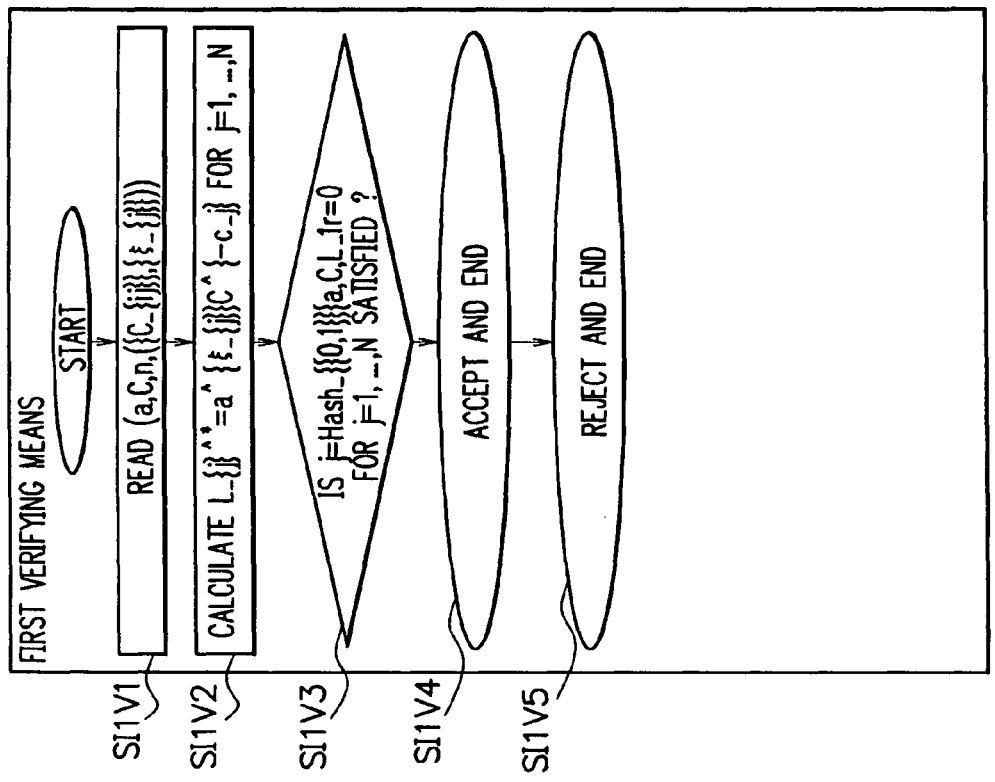
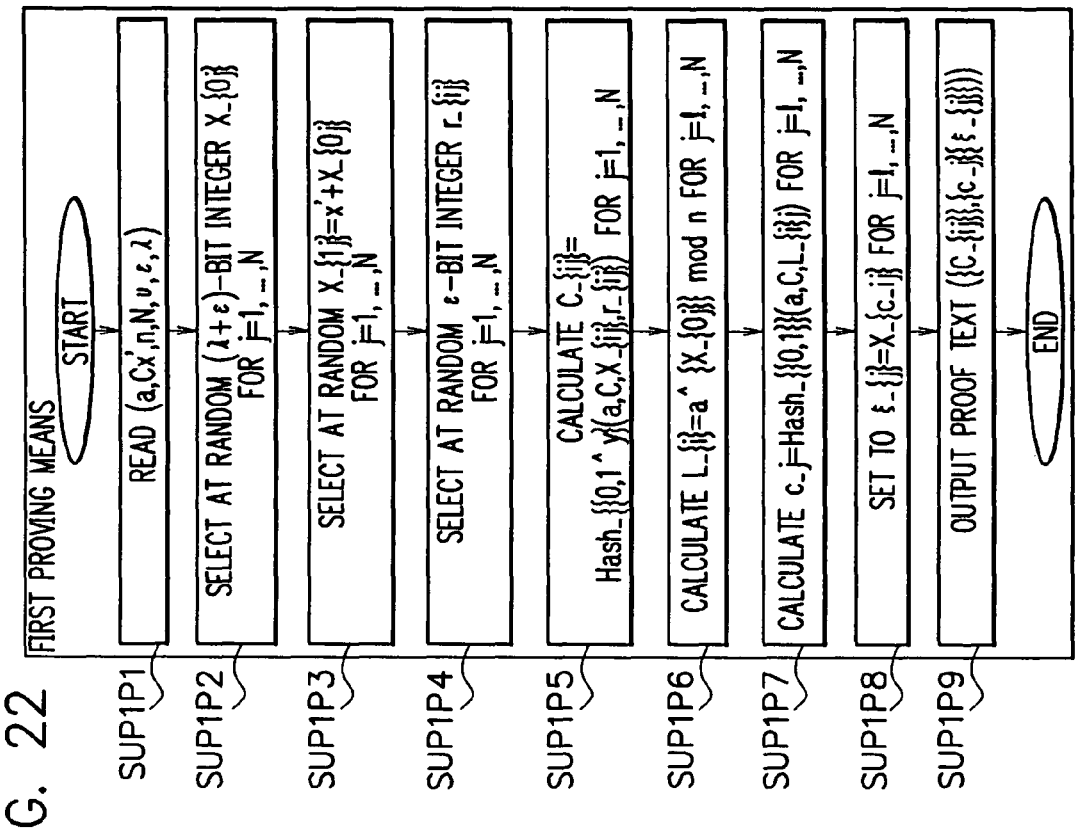

US 8,127,140 B2

GROUP SIGNATURE SCHEME

TECHNICAL FIELD

The present invention relates to a group signature scheme and, more particularly, to an efficient and safe group signature scheme.

BACKGROUND ART

In a group signature scheme, only the user who is identified as a member of a group by a manager can generate a signature text anonymously as the member of the group, and only the manager can specify a signer.

Recently, several group signature schemes have been proposed. As examples of the proposed group signature schemes, there are an RSA-based scheme (see Non-Patent Documents 1 and 6), a pairing-based scheme (see Non-Patent Documents 3, 4, and 7), and a Nyberg-Rueppel-based scheme (see Non-Patent Document 2).

Non-Patent Document 1:G.Ateniese, J. Camenisch, M. joye, and G. Tsudik. A Practical and Provably Secure Coalition-Resistant Group Signature Scheme. In advances in Cryptology—CRYPTO 2000, vol.1880 of LNCS, pp.255-270, Springer -Verlag, 2000.

Non-Patent Document 2:Giuseppe Ateniese and Breno de Medeiros. Efficient Group Signatures without Trapdoors. In Advances in Cryptology—ASIACRYPT 2003, vol.2094 of LNCS, pp. 246-268, Springer-Verlag, 2003.

Non-Patent Document 3:Dan Boneh, Xavier Boyen, and Shacham. Short Group Signatures. Advances in Cryptology—CRYPTO 2004, vol.2656 of LNCS, pp. 614-629, Springer-Verlag, 2004.

Non-Patent Document 4:Jan Camenisch, Anna Lysyanskaya. Signature Schemes and Anonymous Credentials from Bilinear Maps. Advances in Cryptology—CRYPTO 2004, vol.2139 of LNCS, pp. 388-407, Springer-Verlag, 2004.

Non-Patent Document 5:Jan Camenisch and Markus Michels. Proving in Zero-Knowledge that a Number is the Product of Two Safe Primes. In Advances in Cryptology—EUROCRYPT'99, vol.1592 of LNCS, pp.107-122, Springer-Verlag, 1999.

Non-Patent Document 6:Aggelos, Kiayias, and Moti Yung. Group Signatures:Provable Secure, Efficient Constructions and Anonymity from Trapdoor Holders. http://eprint.iacr.org/2004/076.ps Non-Patent Document 7:Lan Nguyen and Rei Safavi-Naini. Efficient and Provably Secure Trapdoor-free Group Signature Schemes from Bilinear Pairings. In Advances in Cryptology—ASIACRYPT 2004, vol.2729 of LNCS, pp. 316-337, Springer-Verlag, 2004.

Non-Patent Document 8:Victor Shoup and Rosario Gennaro. Secureing Threshold Cyptosystems against Chosen Ciphertext Attack. In Advances in Cryptology—EUROCRYPT'98, vol.1403 of Yemph[LNCS], pp.1-16, Springer-Verlag, 2004.

Non-Patent Document 9:Dan Boneh, Xabier Boyen.Short Signatures Without Random Oracles. In Advances in Cryptology—EUROCRYPT 2004 vol 3027 of Yemph[LNCS], pp. 56-73, Springer-Verlag, 2004.

Non-Patent Document 10:Rafael Pass. On Deniability in the Common Reference String and Random Oracle Model. In Advances in Cryptology—CRYPTO 2003, vol.2729 of LNCS, pp. 316-337, Springer-Verlag, 2003.

Non-Patent Document 11:Fabrice Boudot. Efficient Proofs that a Committed Number Lies in an Interval. In EUROCRYPT 2000, LNCS 1807, pp.255-270, Springer-Verlag, 2000.

Non-Patent Document 12:Joe Kilian, and Erez Petrank. Identity Escrow. In CRYPTO'98, LNCS 1462, pp. 169-185, Springer-Verlag, 1998.

SUMMARY OF INVENTION

The aforementioned schemes have the following shortcomings.

The schemes disclosed in Non-Patent Documents 1, 2, 6, and 7 have a problem in safety proof. More specifically, an attack similar to an attack (see Non-Patent Document 8) to a crypto scheme may be performed on an user-added procedure, and the attack may be performed under the assumption that the attacker does not call the user-added procedure without a sequential manner.

In addition, in the scheme disclosed in Non-Patent Documents 1 and 6, a manager may know a secret key of a user by generating a manager's own public key in an illegal manner. In addition, although the manger is obligated to output a validity proof text of the public key, a safety thereof cannot be proven. In addition, in a scheme where the manager is obligated to output the validity proof text of the public key and each user verifies the proof text, an efficiency thereof is deteriorated. In addition, there is a need for $2\times10^{\{10\}}$-times power residue calculations so as to represent that a portion n of the public key is an RSA modulus (see Non-Patent Document 5).

In the scheme disclosed in Non-Patent Documents 3 and 4, the safety is proven under an artificial assumption such as a q-SDH assumption (see Non-Patent Document 9). In addition, in the scheme disclosed in Non-Patent Document 4, the safety is proven under an artificial assumption such as an LRSW assumption (see Non-Patent Document 4).

Therefore, an object of the present invention is to provide a group signature scheme where an open means is provided to not an issuer but an opener and a data required for operating the open means does not include a key pair of the issuer, so that it is possible to accurately operate the open means although the issuer generates the public key in an illegal manner.

According to one aspect of the of the invention, a group signature scheme of a proving apparatus includes an input means, a calculating means, and an output means. The input means reads a data required for calculation. When N is set to one of security parameters and a knowledge of a discrete logarithm of (a, C) is proven, the calculating means selects at random N integers $X\_\{1j\}$ and calculates $X\_\{1j\}$ for each j by using secret information x' and the $X\_\{0j\}$. The calculating means selects $r\_\{ij\}$ for each j and calculates a hash value $C\_\{ij\}$ of a data including the $X\_\{ij\}$ and the $r\_\{ij\}$. The calculating means calculates $L\_\{j\}$ for each j by raising the a to the power $X\_\{0j\}$. The calculating means selects a challenge $c\_j$ for each j and setting $\xi\_\{j\}$ for each j to the $X\_\{c\_ij\}$. The output means outputs a data including the $\{C\_\{ij\}\}$ and the $\{\xi\_\{j\}\}$.

According to another feature of the invention, a group signature scheme of a verifying apparatus has an input means, a calculating means, and an output means. The input means reads a data required for calculation. When a knowledge of a discrete logarithm of (a, C) is proven, the calculating means acquires a challenge $c\_j$ for each j. The calculating means calculates $L\_\{j\}^{\wedge}*$ by multiplying a value obtained by raising the C to the power a sign-inverted $c\_j$ with a value obtained by raising the a to the power a portion $\xi\_\{j\}$ of the input data. The calculating means checks whether or not a hash value of a data including the $L\_\{j\}^{\wedge*}$ is equal to the challenge $c\_j$. If the hash value of the data including the $L\_\{j\}^{\wedge*}$ is not equal to the challenge $c\_j$, the output means outputs a message indicating that the proving of the knowledge of the discrete logarithm of the (a, C) is not valid.

According to another feature of the invention, a group signature scheme of a user apparatus communicates with an issuer apparatus to generate a member secret key, a member public key, and user-specified information. A first step provides for reading a required data including a public key of an issuer. A second step provides for generating at random an integer x', calculating power residue, and transmitting a calculation results C of the power residue to the issuer apparatus. A third step provides for receiving a number x" generated by the issuer apparatus, calculating x by using the x' and the x", setting the x to the member secret key or a portion thereof, calculating at least two-times power residue, transmitting at least β of calculation results β and B of the two-times power residue to the issuer apparatus, and setting the B to the user-specified information, wherein the β is obtained by calculating the power residue using a portion G of the public key of the issuer apparatus as a base and the x as an exponent. A fourth step provides for receiving an integer e and an element b of a quadratic residue group with an RSA modulus from the issuer apparatus. A fifth step provides for adding the (b, e) to the member public key or a portion thereof and outputting the member public key and the member secret key, wherein the power residue calculation is performed by setting a portion a of the public key of the issuer apparatus to a base and setting the x' to an exponent, wherein the B is calculated by using power residue with the a as a base and the x as an exponent, wherein the G is an element of a group of which order is publicized, and wherein the a is an element of a quadratic residue group with an RSA modulus.

Another aspect of the present invention provides a group signature scheme for calculating a straight-line extractable validity proof text of the C and a proof text for proving that a discrete logarithm of the C with the a as a base is included in a predetermined interval and transmitting the C, the straight-line extractable validity proof text, and the proof text for proving that the discrete logarithm is included in the predetermined interval to the issuer apparatus, and wherein the third step comprises a step of generating a validity proof text of the (β, B) and transmitting the validity proof text of the (β, B) to the issuer apparatus.

According to another aspect of the present invention, a group signature scheme provides for generating the straight-line extractable validity proof text. A first step provides for reading a required data and selecting at random $X\_\{01\}, \ldots, X\_\{0N\}$; a step of calculating $X\_\{1j\}$ for each j obtained by adding the x' to the $X\_\{0j\}$, selecting at random number r, calculating a hash value $C\_\{ij\}$ of a bit column including $X\_\{ij\}$ and r for each ij, and a hash value V of a bit column including the hash value $C\_\{ij\}$. A second step provides for calculating an inner product X of the V and a vector of $X\_\{01\}, \ldots, X\_\{0N\}$. A third step provides for generating $c\_1, \ldots, c\_N$ from hash values of a data including L obtained by raising the data a which is a portion of publicized information of an issuer to the power of X. A fourth step provides for outputting a data including r, $\{C\_\{ij\}\}$, L, and Ξ as the straight-line extractable validity proof text, and wherein the $X\_\{c\_jj\}$ is $\xi\_j$, and the $\xi\_1, \ldots, \xi\_N$ is the Ξ.

According to another aspect of the present invention, the group signature scheme generates a straight-line extractable validity proof text.

According to an additional aspect of the invention, a group signature scheme of an issuer apparatus includes communicating with a user apparatus to generate a member secret key, a member public key, and a user-specified information. A first step provides for reading a data including a public key and a secret key. A second step provides for generating at random a number x" and transmitting the x" to the user apparatus. And a third step provides for calculating (b, e) by using a data received from the user apparatus or a portion β thereof, wherein the β is an element of a quadratic residue group with an RSA modulus n, wherein the e is selected at random, wherein the b is generated by raising the β to the power 1/e as a modulus of the n.

According to one aspect of the invention, a group signature scheme provides for receiving from the user apparatus a data C, a straight-line extractable validity proof text of the data C, and a proof text for proving that a discrete logarithm of the data C with a portion a of the public key of the issuer as a base is included in a predetermined interval. The group signature scheme further provides for verifying a validity of the straight-line extractable validity proof text and a validity of the proof text for proving that the discrete logarithm is included in the interval, and wherein the third step comprises: receiving the data B and a validity proof text of the (β, B); and verifying a validity of the validity proof text of the (β, B).

Another aspect of the present invention includes a group signature scheme that provides for verifying of the validity of the straight-line extractable validity proof text comprises: reading a required data including the straight-line extractable validity proof text, generating $K=(c\_1, \ldots, C\_N)$ from a hash value of a data including $\{C\_\{ij\}\}$, L, and r, wherein the read straight-line extractable validity proof text includes r, $\{C\_\{ij\}\}$, L, and Ξ, and a hash value of a data including the $\{C\_\{ij\}\}$ is set to V[[;]], and accepting the validity proof text if $C\_\{c\_jj\}$ for all j is a hash value of a data including $\xi\_j$, $c\_j$, and r, and if a value obtained by raising a portion a of the public key of the issuer apparatus to the power of an inner product of V and Ξ is equal to a value obtained by multiplying L with a value obtained by raising the data C to the power of an inner product of V and K.

According to one features of the present invention, the group signature scheme performs the verifying of the straight-line extractable validity proof text.

According to another aspect of the present invention, a group signature scheme includes a first step of selecting a random number ρ and generating a Cipher where user-specified information B is encrypted by using a public key of an opener apparatus or a portion thereof and the ρ. An input means reads a data required for calculation. A commitment means selects at random u and e' and acquires a commitment $\chi\_b$ of a portion b of a public key of the user apparatus, a commitment $\chi\_e$ of a portion e of the public key of the user apparatus, a commitment $\chi\_u$ of u, a commitment $(d\_1, d\_2)$ used for verifying a satisfaction of a verification equation associated with an RSA modulus, a commitment $d\_e$ of e', and a commitment ComCipher used for verifying that the Cipher is a valid cipher text. A challenge means acquires a challenge l. A response means acquires a response x" representing a knowledge of a secret key x of the user apparatus, a response e" representing a knowledge of the e, a response u" representing a knowledge of the u, a response u"_e representing a knowledge of a product of the u and the e, and a response ρ" representing a a knowledge of the ρ. And an output means outputs the responses.

According to another aspect of the present invention, a group signature scheme the public key of the opener apparatus is used for calculating the Cipher or a portion thereof include P, Q_1, and Q_2, wherein the Cipher includes G', H'_1, and H'_2, wherein the ComCipher includes the U calculated by performing a scalar product of the G and the ρ', the V_1 obtained by adding the scalar product of the G and the x' to a scalar product of the H_1 and the ρ', and the V_2 obtained by adding the scalar product of the G and the x' to a scalar product of the H_2 and the ρ', wherein, when the G', H'_1, and H'_2 are generated, the user apparatus selects at random a number ρ and calculates G' that is a scalar product of P and ρ, H'_1 that is a scalar product of Q_1 and ρ, and H'_2 that is a scalar product of Q_2 and ρ, wherein the commitment means selects at random numbers s, t, x', t', u'_e, t'_e, and ρ' and calculates a commitment d_u of u', wherein the χ_b is calculated by multiplying a value obtained by raising a portion h of the public key of the issuer to the power of u with a portion b of a public key of a user, wherein the χ_e is calculated by subtracting e with a value obtained by raising 2 to the power of a value γ determined based on a security parameter to calculate E, and by multiplying a value obtained by raising a portion g of the public key of the issuer to the power of the E with a value obtained by raising the h to the power of s, wherein the χ#u is calculated by multiplying a value obtained by raising the g to the power of u with a value obtained by raising the h to the power of the t, wherein the d_1 is calculated by multiplying a value obtained by raising a portion a of the public key of the issuer to the power of -x' with a value obtained by raising the χ_b to the power of e' and a value obtained by raising the h to the power of a number U, wherein the U is calculating by inverting a sign of a value obtained by adding the u'_e to a value obtained by multiplying a value obtained by raising 2 to the power of the γ with the u', wherein the d_2 is calculated by multiplying a value obtained by raising the χ_u to the power of -e' with a value obtained by raising the g to the power of the u'_e and a value obtained by raising the h to the power of the t'_e, wherein the d_e is calculated by multiplying a value obtained by raising the g to the power of the e' with a value obtained by raising the h to the power of the s', wherein the d_u is calculated by multiplying a value obtained by raising the g to the power of the u' with a value obtained by raising the h to the power of the t'.

According to another aspect of the present invention, a group signature scheme includes calculating a response s" representing a knowledge of the s, a response t" representing a knowledge of the t, and a response t"_e representing a knowledge of a product of the t and the e, wherein the x" is a value obtained by adding the x' to a product of the x and the 1, wherein the e" is a value obtained by adding the e' to a product of the 1 and a value obtained by subtracting the e with a value obtained by raising 2 to the power of the λ, wherein the u" is a value obtained by adding the u' to a product of the u and the 1, wherein the s" is a value obtained by adding the s' to a product of the s and the 1, wherein the t" is a value obtained by adding the t' to a product of the t and the 1, wherein the u"_e is a value obtained by adding the u'e to a product of the 1 and u and a value obtained by subtracting the e with a value obtained by raising 2 to the power of the λ, wherein the t"_e is a value obtained by adding the t'_e to a product of the t and 1 and a value obtained by subtracting the e with a value obtained by raising 2 to the power of the λ, wherein the ρ" is a value obtained by adding the ρ' to a product of the ρ and the 1, wherein the χ_b, the χ_e, the χ_u, the x", the e", the u", the s", the t", the u"_e, the t"_e, and the ρ" are output as a portion of a data.

Another feature of the present invention includes, a group signature scheme wherein the 1 is a hash value of a data including the (χ_b, (χ_e, χ_u), d_1, d_2, (d_e, d_u), (U, V_1, V_2)).

Another feature of the present invention provides a group signature scheme wherein the 1 is included in a portion of an output data.

According to another aspect of the present invention, (χ_b, (χ_e, χ_u), d_1, d_2, (d_e, d_u), (U, V_1, V_2)) is included in a portion of an output data.

According to another aspect of the present invention, a group signature scheme of a verifying apparatus includes an input means for inputting a data, a verifying means for verifying the data, and an output means for outputting a verification result of the verifying means. The input means inputs publicized information and a data output by a user apparatus and a challenge 1, wherein the data includes χ_b, χ_e, χ_u, x", e", u", s", t", u"_e, r_e, and ρ". The output means outputs a data representing whether or not a signature text is a valid signature text of a message. The verifying means comprises a commitment calculating means, a validity verifying means, and a interval verifying means. The commitment calculating means calculates d_1^*, d_2^*, d_^*, d_u^*, U^*, V_1^*, and V_2^*, wherein the d_1^* is a value obtained by multiplying a value obtained by raising a portion a_0 of a public key of an issuer apparatus to the power of a sign-inverted value of the 1 with a value obtained by raising a portion a of a public key of an issuer apparatus to the power of a sign-inverted value of the x", a value obtained by raising χ_b to the power of a value obtained by adding e to a product of 1 and a value obtained by raising 2 to the power of a value γ determined based on a security parameter, and a value obtained by adding u"_e to a product of the u" and a value obtained by raising 2 to the power of the γ, wherein the d_2^* is obtained by multiplying a value obtained by raising the χ_u to the power of -e" with a value obtained by raising a portion g of the public key of the issuer apparatus to the power of the u"_e and a value obtained by raising a portion h of the public key of the issuer apparatus to the power of the t"_e, wherein the d_e^* is obtained by multiplying a value obtained by raising the χ_e to the power of a sign-inverted value of the 1 with a value obtained by raising the g to the power of the u"_e and a value obtained by raising the h to the power of the s", wherein the d_u^* is obtained by multiplying a value obtained by raising the χ_u to the power of a sign-inverted value of the 1 with a value obtained by raising the g to the power of the u" and a value obtained by raising the h to the power of the t". The U^* is a value obtained by adding a scalar product of a sign-inverted value of the 1 and P to a scalar product of the ρ" and the G. The V_1^* is a value obtained by adding a scalar product of a sign-inverted value of the 1 and Q_1 to a scalar product of the x" and the G and a scalar product of the ρ" and the H_1. The V_2^* is a value obtained by adding a scalar product of a sign-inverted value of the 1 and Q_2 to a scalar product of the x" and the G and a scalar product of the ρ" and the H_2. The interval verifying means verifies whether or not the x" and the e" are included in a predetermined interval.

According to another feature of the present invention, 1 is included in the data output by the user apparatus.

According to another feature of the present invention, 1 is a hash value of a data including the (χ_b, (χ_e, χ_u), d_1^*, d_2^*, (d_e^*, d_u^*), (U^*, V_1^*, V_2^*)).

According to another aspect of the present invention, data output by the user apparatus includes seven types of data. The verifying means uses a hash value of a data including the seven types of data as the 1, and wherein the verifying apparatus verifies whether or not the seven types of data are equal to the d_1^*, the d_2^*, the d_e^*, the d_u^*, the U^*, the V_1^*, and the V_2^*.

According to one feature of the present invention, an open unit is provided to not an issuer but an opener, and a data required for operating the open unit does not include a key pair of the issuer, so that it is possible to accurately operate the open unit although the issuer generates the public key in an illegal manner.

In addition, according to another feature of the present invention, it is possible to prove that a key pair of a member cannot be counterfeited in a method which is the same as that of Non-Patent Document 1. It is possible to implement from a discrete logarithm assumption a feature that a cipher text, that is, a portion of a signature text can be decrypted by only the opener in a method which is the same as a method representing that an ElGamal crypto scheme is safe. In addition, it is possible to implement from an random oracle assumption a feature that a knowledge signature has an extractability in a method which is the same as a method proving that a Schnorr signature is safe.

In addition, according to another feature of the present invention, since the open unit can be accurately operated although the public key generated in an illegal manner by the issuer is publicized, there is no need to generate a proof text representing that a portion n of the public key of the issuer is an RSA modulus unlike Non-Patent Document 1.

In addition, according to another feature of the present invention, it is possible to prove the safety under only a strong RSA assumption, an L decision Diffie Helman assumption, and an random oracle assumption. In addition, since a discrete logarithm problem on a finite field with a prime factor of n as a modulus does not need to be difficult unlike Non-Patent Document 1, so that it is possible to reduce the number of bits of n down to a half of that of the scheme disclosed in Non-Patent Document 1.

BRIEF DESCRIPTION OF THE DRAWINGS

FIG. 1 is a block diagram illustrating construction of a group signature scheme according to an exemplary embodiment of the present invention.

FIG. 2 is a flowchart of processes of the group signature scheme according to a first exemplary embodiment of the present invention.

FIG. 9 is a flowchart of processes of the group signature scheme according to a first exemplary embodiment of the present invention.

FIG. 15 is a flowchart of processes of the group signature scheme according to a first exemplary embodiment of the present invention.

FIG. 17 is a flowchart of processes of the group signature scheme according to a second exemplary embodiment of the present invention.

FIG. 18 is a block diagram illustrating construction of a group signature scheme according to a third embodiment of the present invention.

FIG. 22 is a flowchart of processes of the group signature scheme according to a fourth embodiment of the present invention.

DESCRIPTION OF EXEMPLARY EMBODIMENTS

Figure 3:
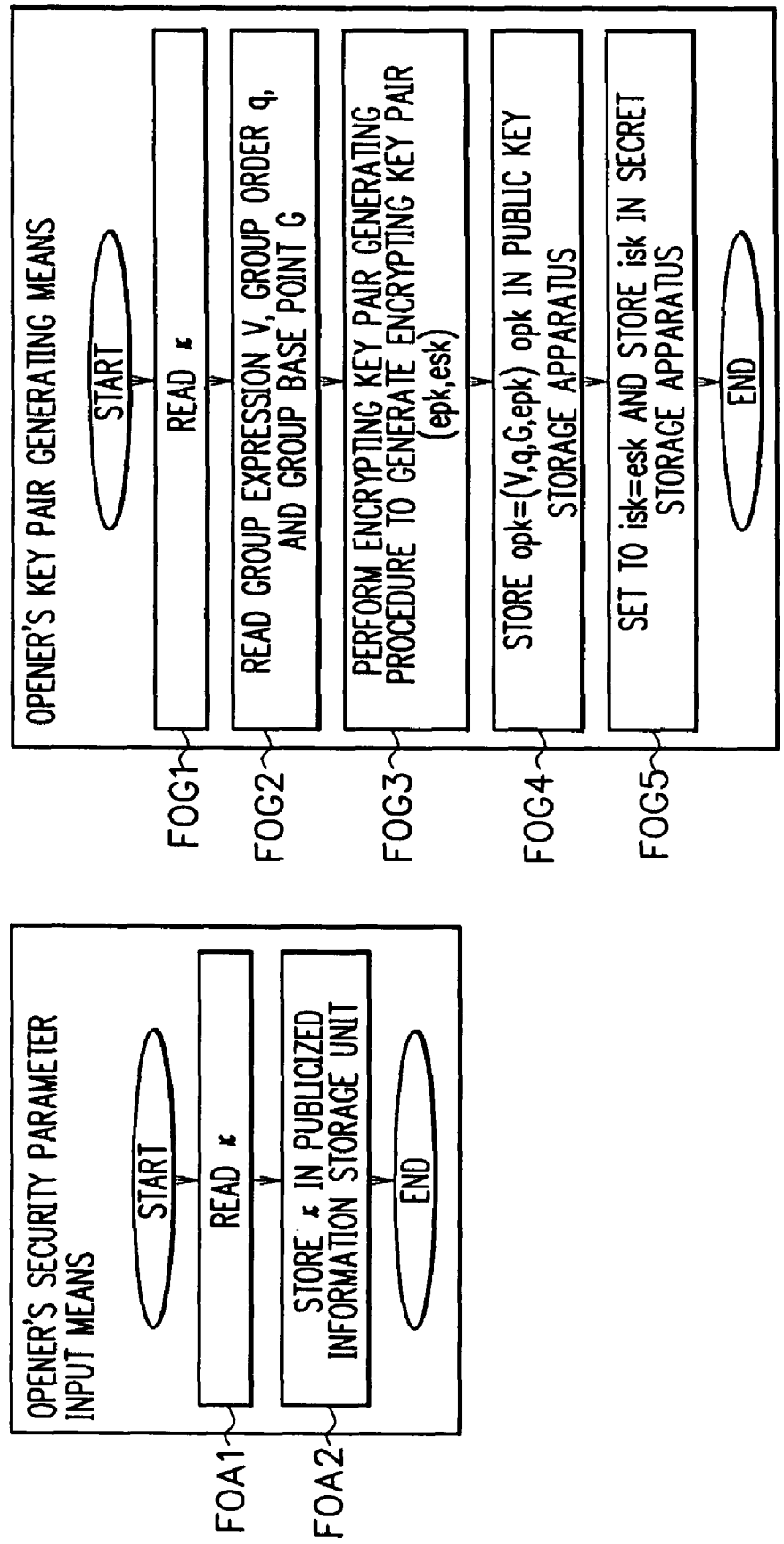
FIG. 3 is a flowchart of processes of the group signature scheme according to a first exemplary embodiment of the present invention.

[Reference Numerals]
MI: issuer apparatus
ML: user-specified information storage apparatus
MO: opener apparatus
MV: verifying apparatus
MU: user apparatus
FIA: issuer's security parameter input unit
FIG: issuer's key pair generating unit
MIS: secret key storage unit
MIP: public key storage unit
FII: issuing unit
FOA: opener's security parameter input unit
FOG: opener's key pair generating unit
MOP: public key storage unit
MOS: secret key storage unit
FOO: open unit
FOB: output unit

[First Exemplary Embodiment]

In the embodiment, N, Z, Zn, and QZ(n) denote a set of all natural numbers, a ring of integers, a ring of integers of 0 to n-1, and a multiplicative group of quadratic residues in the Zn, respectively. A hash function of a set X is denoted by H_X. The number of bits of |n| of an integer n is denoted by ||n||. A prime number p of which (p-1)/2 is a prime number is defined as a safe prime. An integer n which is a product of two safe primes having the same bit length is defined as a rigid integer (rigid modulus). A set of real numbers which are equal to or larger than a and less than b is denoted by [a, b).

Security parameters are denoted by $\theta$, $\kappa$, $\mu$, and $\epsilon$. In addition, $\lambda=\theta+\kappa+\epsilon$, $\gamma=\lambda+\mu+\epsilon+8$, $\Lambda=[0, 2^\lambda]\cap N$, and $\Gamma=(2^\gamma, 2^\gamma+2^\lambda)$ are satisfied.

A construction of an apparatus according to the embodiment is described with reference to FIG. 1.

The apparatus according to the embodiment includes an issuer apparatus MI, a user-specified information storage apparatus ML, an opener apparatus MO, a user apparatus MU, and a verifying apparatus MV.

In the embodiment, 5 types of apparatuses are described. However, for example, a function of the issuer apparatus MI and a function of the opener apparatus MO may be implemented in one apparatus, so that one apparatus may have functions of a plurality of apparatuses. In addition, although each type of apparatuses are provided as one apparatus in the figure, a plurality of the apparatuses of same type may be provided.

The issuer apparatus MI, the user-specified information storage apparatus ML, the opener apparatus MO, the user apparatus MU, and the verifying apparatus MV include communication units MIC, MLC, MOC, MUC, and MVC, respectively, to communicate with other apparatuses through the communication units. A communication unit may use, for example, the Internet, a radio wave, or a telephone line, but not limited thereto.

The issuer apparatus MI, the opener apparatus MO, the user apparatus MU, and the verifying apparatus MV include publicized information storage units MII, MOI, MUI, and MVI, respectively, to store publicized information which is publicized by other apparatuses.

The publicized information which is published by other apparatuses may be acquired, for example, through a method of using a communication unit or a method of using a dedicated apparatus for storing the publicized information and acquiring the publicized information therefrom, but not limited thereto. In addition, when each of the apparatuses acquires the publicized information of other apparatuses is not in question.

Next, the communication unit, a unit of the publicized information storage unit, and the storage unit are described.

The issuer apparatus includes an issuer's security parameter input unit FIA, an issuer's key pair generating unit FIG, a secret key storage unit MIS, a public key storage unit MIP, and an issuing unit FII.

In addition, the issuer's key pair generating unit FIG includes as a subroutine an issuer's key validity proof text generating procedure SIP.

In addition, the issuing unit FII includes as a subroutine a first verifying procedure SI1V and a second verifying procedure SI2V.

The opener apparatus MO includes an opener's security parameter input unit FOA, an opener's key pair generating unit FOG, a public key storage unit MOP, a secret key storage unit MOS, an open unit FOO, and an output unit FOB.

In addition, the opener's key pair generating unit FOG includes as a subroutine an encrypting key pair generating procedure SOG.

The user-specified information storage apparatus ML includes a user-specified information list storage unit MLL.

The user apparatus MU includes a joining unit MUJ, a plain text input unit FUM, a signature unit FUS, and an output unit FOB.

In addition, the joining unit MUJ includes an issuer's key validity proof text verifying procedure SUV, a first verifying procedure SU1P, and a first verifying procedure SU2P.

In addition, the signature unit MUS includes as a subroutine an encrypting procedure SUE and a knowledge signature generating procedure SUS.

The verifying apparatus MV includes a verifying unit FVV and an output unit FVB.

In addition, the verifying unit FVV includes as a subroutine a knowledge signature verification procedure SVV.

Next, operations of each of the apparatuses are described.

The issuer apparatus MI manages a group of the user apparatus(s) and joins a user apparatus MU to the group. The user apparatus MU that is a member of the group can generates a signature text as the member of the group. The verifying apparatus MV verifies a validity of the signature text. The opener apparatus MO communicates with the user-specified information storage apparatus ML to specify the user apparatus which generate the signature text. The user-specified information storage apparatus ML stores a a table which includes correspondence between user-specified information that is information required for specifying the user apparatus and each of the user apparatuses in some format. As an example of a correspondence method, there is a method of allocating ID to each user apparatus and corresponding to the user-specified information of each of the user apparatuses to the ID of each of the user apparatuses. Hereinafter, description is made based on a case where the correspondence is obtained by using the aforementioned method.

Firstly, when the security parameters $\theta$, $\mu$, and $\epsilon$ are received, the issuer apparatus MI stores the security parameters $\theta$, $\mu$, and $\epsilon$ in the publicized information storage unit MII (F1A).

Firstly, when the security parameter $\kappa$ is received, the opener apparatus MO stores security parameter $\kappa$ in the publicized information storage unit MOI (FOA).

Next, the issuer apparatus MI performs processes of the issuer's key pair generating unit FIG as input of the security parameters $\theta$, $\mu$, $\epsilon$, and $\kappa$ to generate an issuer's public key ipk and an issuer's secret key isk and stores the issuer's public key ipk and the issuer's secret key isk in the public key storage unit MIP and the secret key storage unit MIS, respectively.

Next, the opener apparatus MO performs processes of the issuer's key pair generating unit FOG as input of the security parameters $\theta$, $\mu$, $\epsilon$, and $\kappa$ to generate an opener public key opk and an opener secret key osk and stores the opener public key opk and the opener secret key osk in the public key storage unit MOP and the secret key storage unit MOS, respectively.

The user apparatus MU may be joined to the group by communication with the issuer apparatus MI. The communication between the user apparatus MU and the issuer apparatus MI is performed through communication apparatuses MIC and M UC. When the user apparatus is joined to the group, the issuer apparatus MI performs processes of the issuing unit FII. The user apparatus MU performs processes of the joining unit FUJ. The issuing unit FII uses the security parameters $\theta$, $\mu$, $\epsilon$, and $\kappa$, the issuer's public key ipk, the opener public key opk, and the issuer's secret key isk as input, and the joining unit FUJ uses the security parameters $\theta$, $\mu$, $\epsilon$, and $\kappa$, the issuer's public key ipk, and the opener public key opk as input.

By performing the processes of the units, a public key upk, a secret key usk, and a user-specified information uti of the user apparatus MU are generated. In addition, before the processes ends, the user-specified information uti is stored in the user-specified information storage unit MLL of the user-specified information storage apparatus. In addition, the user apparatus MU stores the public key upk and the secret key usk in the public key storage unit MUP and the secret key storage unit MUS, respectively.

The user apparatus MU that is the member of the group generates the signature text. The user apparatus MU receives a message M from the plain text input unit FUM and performs process of the signature unit MUS by using the message M, the public key upk, the secret key usk, and the publicized information ($\theta$, $\mu$, $\epsilon$, $\kappa$, issuer's public key ipk, and opener public key opk) to generate the signature text Signature. The user apparatus MU outputs the generated signature text Signature through the output unit FOB.

The verifying apparatus MV performs processes of the verifying unit FVV to verify the validity of the signature text Signature. The verifying unit FVV uses the message M, the signature text Signature, and the publicized information ($\theta$, $\mu$, $\epsilon$, $\kappa$, issuer's public key ipk, opener public key opk) as input.

The verifying unit FVV outputs a message indicating that the signature text Signature is valid or a message indicating that the signature text Signature is not valid. Hereinafter, the message indicating that the signature text Signature is valid is referred as ACCEPT, and the message indicating that the signature text Signature is not valid is referred to as REJECT. The verifying unit FVV outputs the verification result through the output unit FVB.

The opener apparatus MO performs processes of the open unit FOO to specify the user apparatus that generates the signature text Signature. The open unit FOO uses the message M, the signature text Signature, the secret key osk, and the publicized information ($\theta$, $\mu$, $\epsilon$, $\kappa$, issuer's public key ipk, opener public key opk) as input.

The open unit FOO specifies the user apparatus that generates the signature text Signature by using a data that the user-specified information storage apparatus ML stores in the user-specified information list storage unit. Next, information indicating which user apparatus generates the signature text Signature is output through the output unit FOB.

Detailed processes of the issuer's security parameter input unit FIA are described with reference to FIG. 2.

Firstly, the issuer's security parameter input unit FIA reads the security parameters $\theta$, $\mu$, and $\epsilon$ from the publicized information storage unit MII (FIA1) and stores the security parameters $\theta$, $\mu$, and $\epsilon$ in the publicized information storage unit (FIA2).

Detailed processes of the issuer's key pair generating unit FIG are described with reference to FIG. 2.

Figure 4:
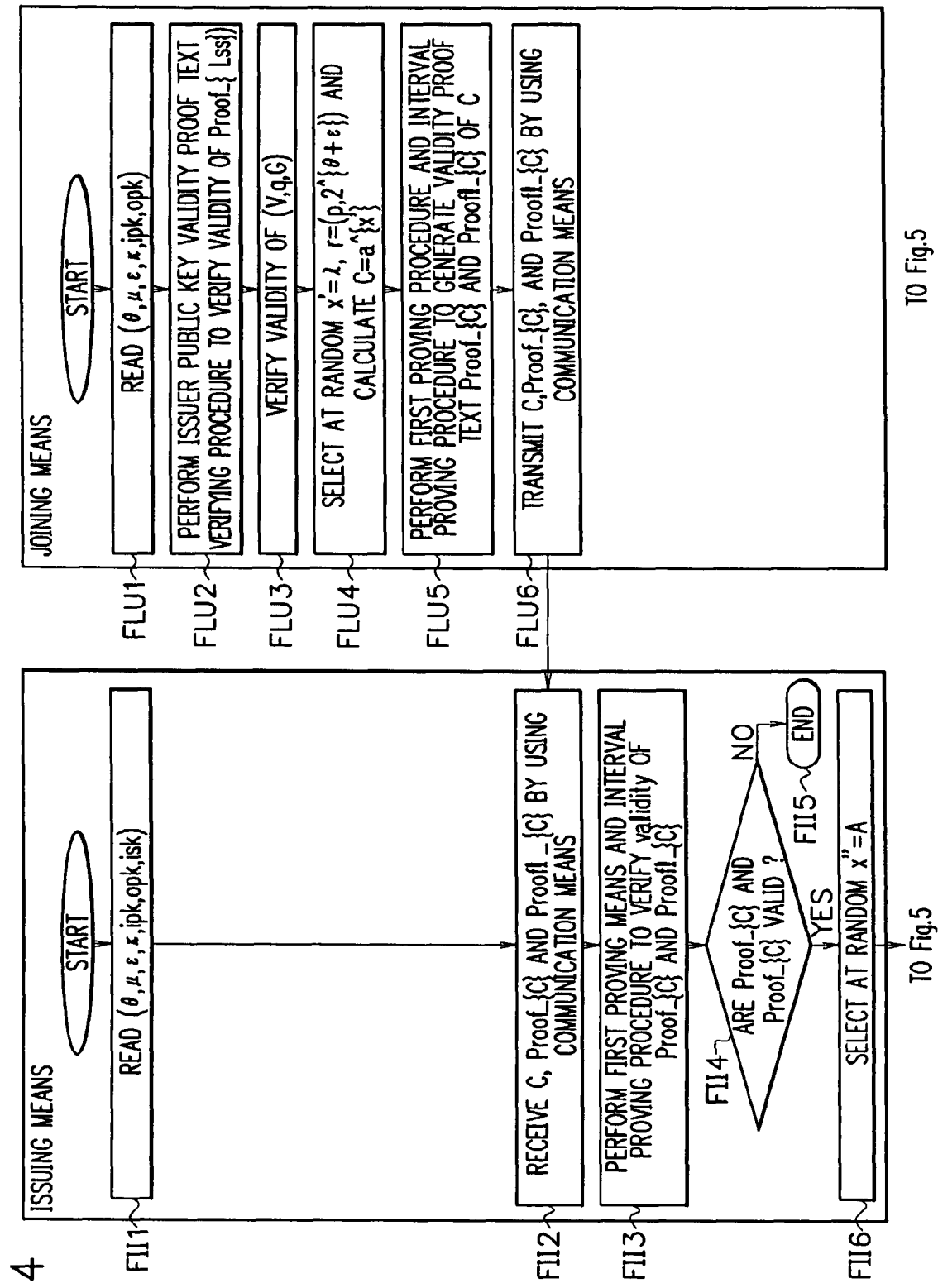
FIG. 4 is a flowchart of processes of the group signature scheme according to a first exemplary embodiment of the present invention.
Figure 5:
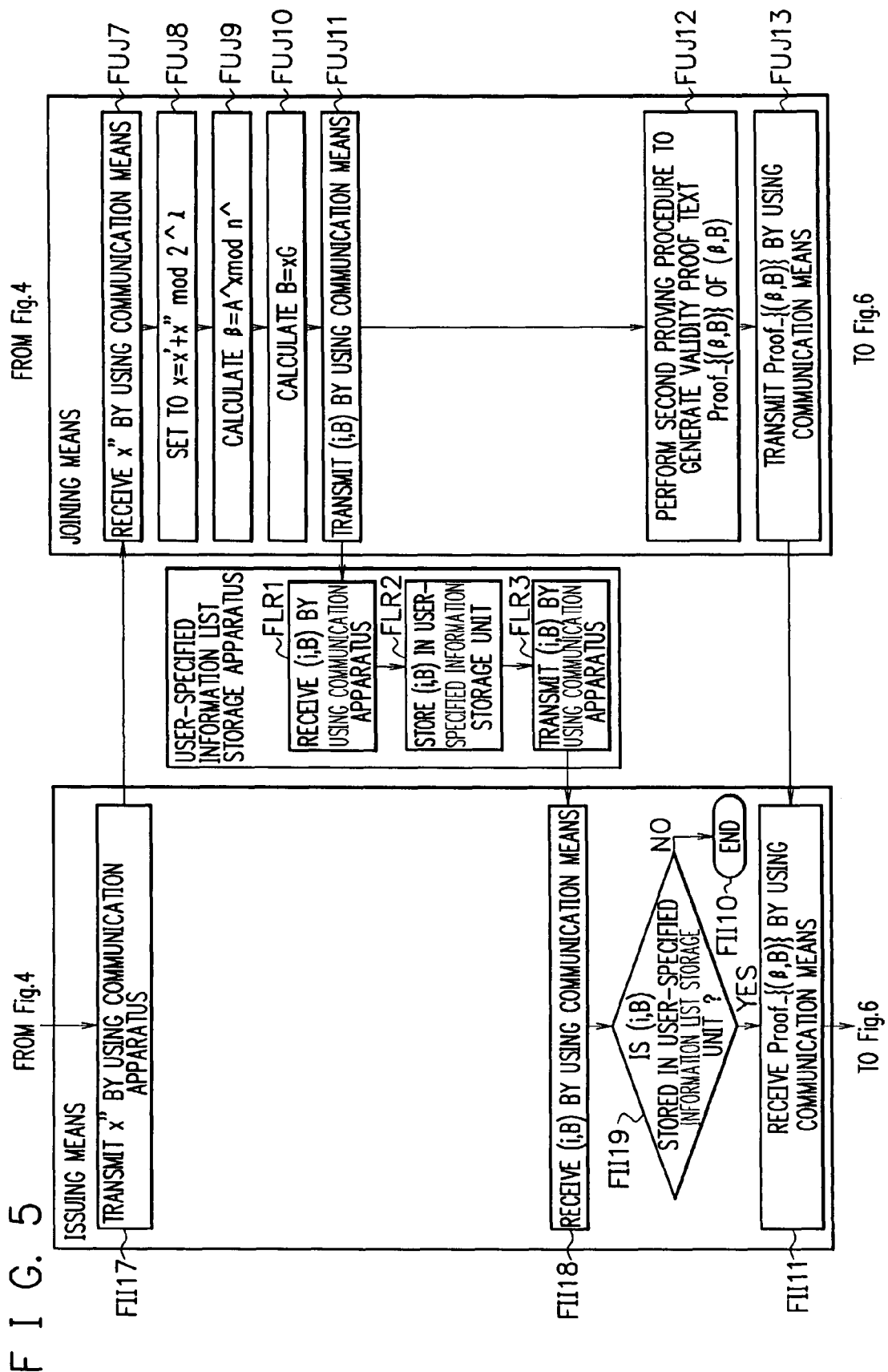
FIG. 5 is a flowchart of processes of the group signature scheme according to a first exemplary embodiment of the present invention.
Figure 6:
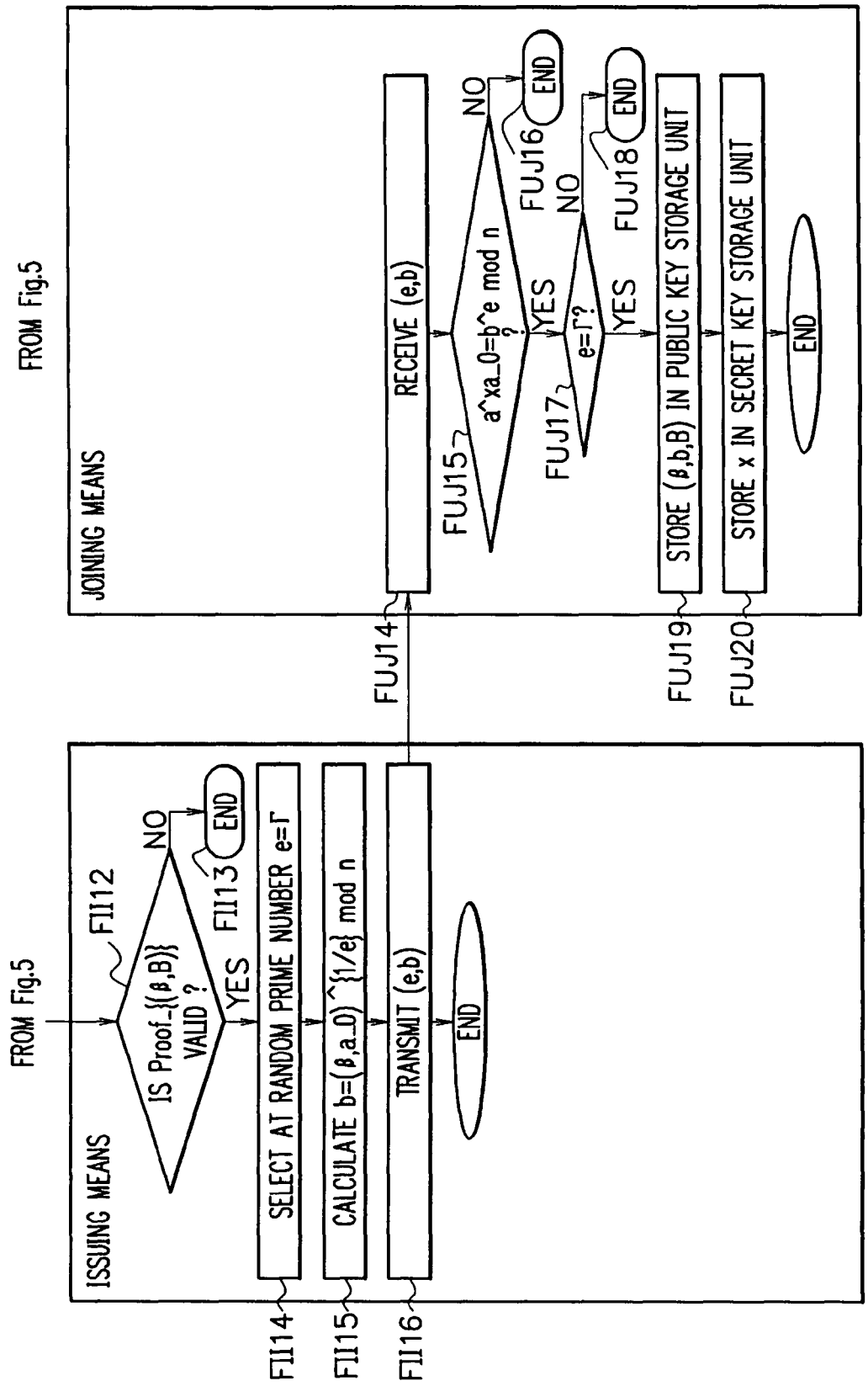
FIG. 6 is a flowchart of processes of the group signature scheme according to a first exemplary embodiment of the present invention.

Firstly, the issuer's key pair generating unit FIG reads the security parameters $\theta$, $\kappa$, and $\epsilon$ from the publicized information storage unit (FIG1) and selects at random $\theta/2$-bit prime numbers p_1 and p_2 (FIG2). Next, the issuer's key pair generating unit FIG calculates n=p_1p_2 (FIG3) and selects at random a$\in$QR(n) (FIG4). Next, the issuer's key pair generating unit FIG selects at random ($\kappa+\epsilon$)-bit numbers T_{0}, T_{1}, and T_{2} (FIG5). Next, the issuer's key pair generating unit FIG calculates a_0=a^{T_{0}}, g=a^{T_{1}}, and h=a^{T_{2}}modn (FIG6).

Figure 7:
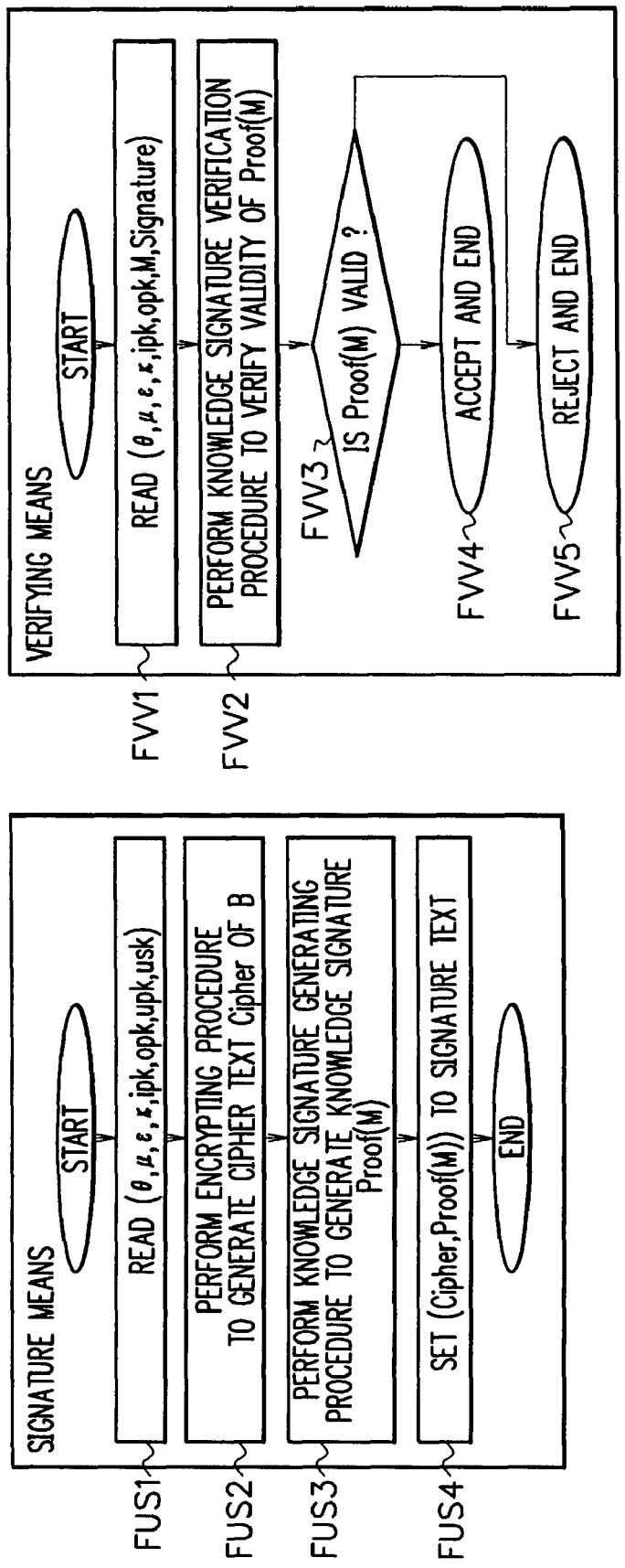
FIG. 7 is a flowchart of processes of the group signature scheme according to a first exemplary embodiment of the present invention.

Next, the issuer's key validity proof text generating procedure SIP is performed to generate Proof_{Iss} (FIG 7).

Figure 8:
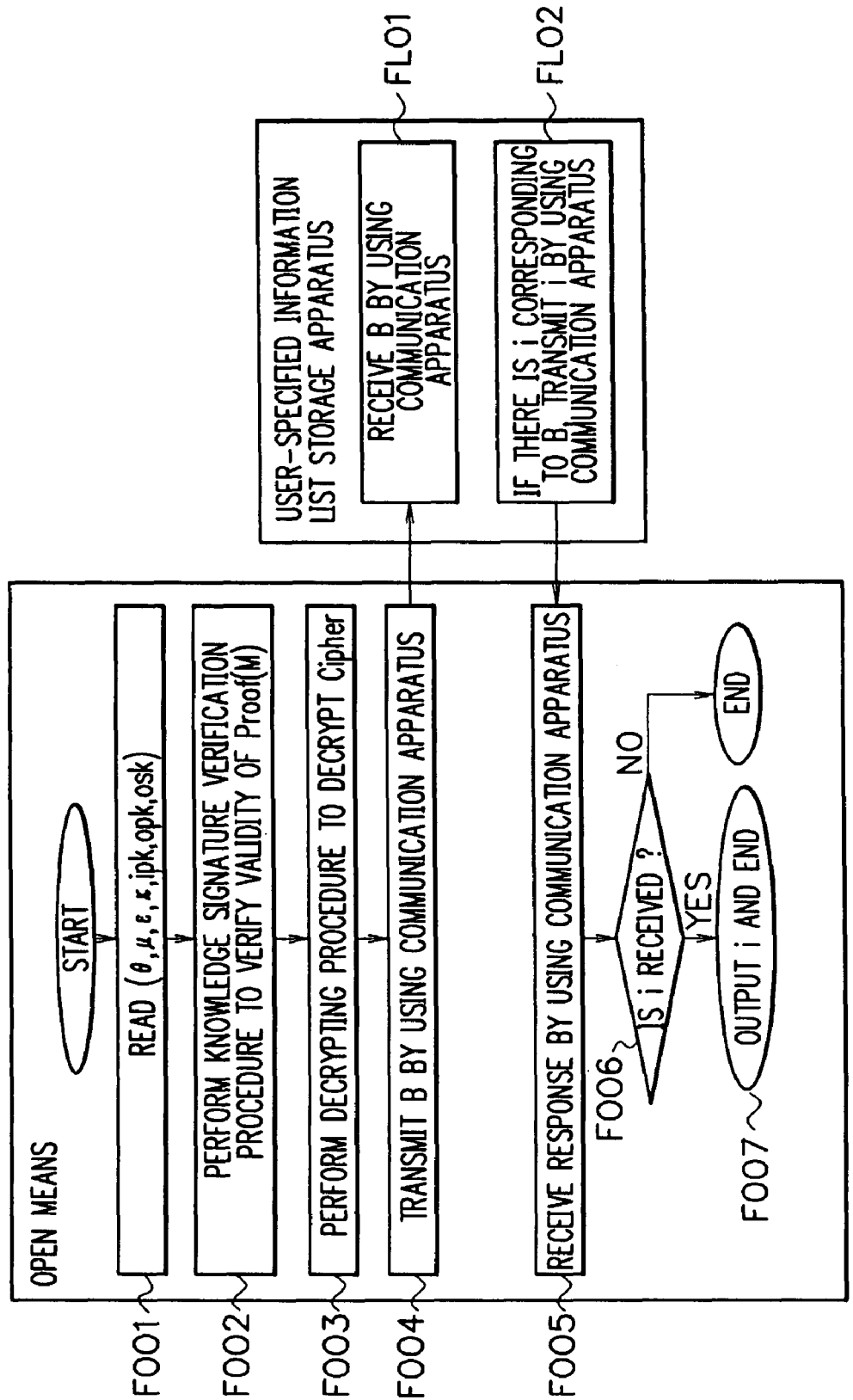
FIG. 8 is a flowchart of processes of the group signature scheme according to a first exemplary embodiment of the present invention.

Next, the issuer's public key ipk=(n, a, a_0, g, h, Proof_[Iss]) is set, and the issuer's public key ipk is stored in the public key storage apparatus (FIG 8).

Next, the issuer's secret key isk=(p_1, p_2) is set, and the issuer's secret key is stored in the secret storage apparatus (FIG 9). In terms of safety, it is preferable that the issuer's key validity proof text generating procedure SIP is performed to generate Proof#[Iss], and the issuer's public key ipk=(n, a, a_0, g, h, Proof#[Iss]) is set. However, the issuer's key validity proof text generating procedure SIP may be omitted, and the issuer's public key ipk=(n, a, a_0, g, h) may be set. In a case where the issuer's key validity proof text generating procedure SIP is omitted, the issuer's key validity proof text verifying procedure SUV of the joining unit FUJ is also omitted. In addition, in a case where the generation of the Proof#[Iss] is omitted, a method of generating a_0, g, and h may be simplified. Processes of the FIG5 and the FIG6 are omitted, and the a_0, g, and h are selected at random from only the QR(n).

In addition, in the aforementioned example, a set of the (n, a, a_0, g, h) and the Proof#[Iss] are publicized as the issuer's public key ipk=(n, a, a_0, g, h, Proof#[Iss]). However, the (n, a, a_0, g, h) and the Proof#[Iss] may be separately publicized.

Detailed operations of the opener's security parameter input unit FOA are described with reference to FIG. 3.

The opener's security parameter input unit FOA reads the security parameter $\kappa$ (FOA1) and stores the security parameter $\kappa$ in the publicized information storage unit (FOA2).

Next, detailed operations of the opener's key pair generating unit FOG are described with reference to FIG. 3.

Firstly, the opener's key pair generating unit FOG reads the $\kappa$ from the publicized information storage unit MOI (FOG1). Next, the opener's key pair generating unit FOG reads a group expression V, a group order q, and a group base point G (FOG2). Detailed processes of the step FOG2 will be described later.

Next, the encrypting key pair generating procedure is performed to generate the encrypting key pair (epk, esk) (FOGS). Next, the opener public key opk=(V, q, G, epk) is stored in the public key storage apparatus (FOG4). Next, the issuer's secret key isk=esk is set, and the issuer's secret key isk is stored in the secret storage apparatus (FOG5).

In addition, in the step FOG2, which apparatus generates a group expression V, a group order q, and a group base point G, with which method the group expression V, the group order q, and the group base point G are generated, with which method the opener apparatus acquires the group expression V, the group order q, and group base point G are not in question. In addition, in terms of safety, difficulty of a Decision Diffie Hellman problem on a group is needed, but which group is used is not in question. As an example of the group where the Decision Diffie Hellman problem is expected to be difficult, there are a partial group of a prime order of a power modulus group or a partial group of a prime order of an elliptic curve group as a cyclic group.

Processes of the issuing unit FII and the joining unit FUJ are described with reference to FIGS. 4 to 6.

The issuer apparatus MI reads ($\theta$, $\mu$, $\epsilon$, $\kappa$, ipk, opk, isk) from the publicized information storage unit MII (FII1). The user apparatus MU reads ($\theta$, $\mu$, $\epsilon$, $\kappa$, ipk, opk) from the publicized information storage unit MUI (FUJ1) and perform the issuer public key validity proof text verifying procedure to check the validity of the Proof#[Iss] (FUJ2). Next, the user apparatus MU checks the validity of (V, q, G) (FUJ3). In addition, in terms of safety, it is preferable that the process of the step FUJ3 is performed. However, in terms of efficiency, the step FUJ3 may be omitted. Next, the user apparatus MU selects at random x'$\in$A and r$\in$[0, 2^{[$\theta+\epsilon$]}] and calculates C=a^{x'} (FUJ4).

Next, the user apparatus MU performs processes of the first proving procedure SU1P to generate a validity proof text Proof#[C] of C and performs processes of the interval proving procedure SUIP to generate a validity proof text Proofl#[C] proving that x' is an element of $\Lambda$ (FUJ5).

Next, the user apparatus MU transmits the C, the Proof#[C], and the Proofl#[C] to the issuer apparatus MI by using the communication unit MUC (FUJ6).

On the other hand, the issuer apparatus MI receives the C, the Proof#[C], and the Proofl#[C] by using the communication unit MIC (FII2), performs the first verifying procedure SI1V to verify the validity of the Proof#[C], and performs the interval verifying procedure SIIV to verify the validity of the Proofl#[C]. Next, if at least one of the Proof#[C] and the Proofl#[C] is not valid, the process is ended (FII3, FII4, and FII5). In addition, in terms of safety, it is preferable that the processes of the steps FUJ6, FII2, FII3, FII4, and FII5 are performed. However, in terms of efficiency, the steps FUJ6, FII2, FII3, FII4, and FII5 may be omitted.

Next, the issuer apparatus MI selects at random $x'' \in \Lambda$ (FII6) and transmits the x" by using the communication unit MIC (FII7). The user apparatus MU receives the x" by using the communication unit MUC (FUJ7) and sets $x=x'+x'' \bmod 2^\lambda$, (FUJ8). In addition, the user apparatus MU calculates $\beta = a^x \bmod n$ (FUJ9). Next, the user apparatus MU calculates $B=xG$ (FUJ10).

Next, the user apparatus MU transmits (i, B) to the user-specified information list storage apparatus ML by using the communication unit (FUJ11), and the user-specified information list storage apparatus ML receives the (i, B) by using the communication apparatus MLC (FLR1) and stores the (i, B) in the user-specified information list storage unit MLL (FLR2).

Before performing the processes of the issuing unit FII, the issuer apparatus MI checks whether or not the (i, B) is stored in the user-specified information list storage unit MLL (FII9). Therefore, the issuer apparatus MI receives the (i, B) from the user-specified information list storage apparatus ML (FLR3 and FII8). If it fails to receive, the issuer apparatus MI ends the processes of the issuing unit (FII10). In addition, in terms of safety, it is preferable that the processes of the steps FII8, FII9, FII10, and FLR3 are performed. However, in terms of efficiency, the processes of the steps FII8, FII9, FII10, and FLR3 may be omitted, but the (i, B) may be received directly from the user apparatus MU. In addition, the (i, B) are received and transmitted by using the communication apparatuses MLC and MIC. In the receiving and transmitting of the (i, B), there is a case where the issuer apparatus MI issues a request for transmitting (i, B) and, after that, the user-specified information list storage apparatus ML transmits the (i, B) and a case where the user-specified information list storage apparatus ML transmits the (i, B) to the issuer apparatus MI without the request for transmitting.

Next, the user apparatus MU performs processes of the second proving unit SU2P to generate a validity proof text Proof#[(β, B)] of (β, B) (FUJ12) and transmits the Proof#[(β, B)] by using the communication unit (FUJ13). The issuer apparatus MI receives the Proof#[(β, B)] by using the communication unit (FII11) and checks whether or not the Proof#[(β, B)] is valid (FII12). Here, if the validity of the Proof#[(β, B)] is not confirmed, the issuer apparatus MI ends the issuing unit (FII13). In addition, in terms of safety, it is preferable that the processes of the steps FUJ12, FUJ13, FII11, FII12, and FII13 are performed. However, in terms of efficiency, the processes of the steps FUJ12, FUJ13, FII11, FII12, and FII13 may be omitted If the validity of the Proof#[(β,B)] is confirmed, the issuer apparatus MI selects at random a prime number $e \in \Gamma$ (FII14) and calculates $b=(\beta, a\_0)^{\{1/e\}} \bmod n$ (FII15). The calculated (e, b) is transmitted to the user apparatus MU through the communication unit MUC (FII16).

The user apparatus MU receives the (e, b) (FUJ14). The user apparatus MU determines whether or not $a^{xa\_0} = b^e \bmod n$ is satisfied, and if not satisfied, the joining unit FUJ is ended (FUJ15 and FUJ16). Next, the user apparatus MU determines whether or not $e \in \Gamma$ is satisfied, and if $e \in \Gamma$ is not satisfied, the processes of the joining unit FUJ are ended (FUJ17 and FUJ18). In addition, in terms of safety, it is preferable that the processes of the steps FUJ17 and FUJ 18 are performed. However, in terms of efficiency, the processes of the steps FUJ17 and FUJ 18 may be omitted Next, the user apparatus MU stores (β, b, B) in the public key storage unit (FUJ19) and stores x in the secret key storage unit (FUJ20).

Next, processes of the signature unit MUS are described with reference to FIG. 7.

Firstly, the signature apparatus MU reads (β, μ, ε, κ, issuer's public key ipk, opener public key opk, public key upk, secret key usk) (FUS1) and performs processes of the encrypting procedure SUE to generate a cipher text Cipher of B (FUS2). Next, processes of the signature generating procedure SUS are performed to generate a knowledge signature Proof(M) (FUS3), and the (Cipher, Proof(M)) is set to a signature text and output (FUS4).

The verifying procedure FVV is described with reference to FIG. 7.

Firstly, the verifying apparatus MV reads (θ, μ, ε, κ, issuer's public key ipk, opener public key opk, Signature) (FVV1). Next, the knowledge signature verification procedure is performed to verify the validity of the Proof(M) (FVV2). Next, if the Proof(M) is valid, a message indicating the Proof(M) is valid is output (FVV4), and if not, a message indicating the Proof(M) is not valid is output (FVV5).

Processes of the open unit are described with reference to FIG. 8.

Firstly, the opener apparatus MO reads (θ, μ, ε, κ, issuer's public key ipk, opener public key opk, opener secret key osk) (FOO1). Next, processes of the knowledge signature verification procedure are performed to verify the validity of the Proof(M) (FOO2). The decrypting procedure is performed to decrypt a cipher text Cipher (FOO3) and transmits B to the user-specified information storage apparatus ML by using the communication apparatus (FOO4 and FOO5).

When the B is received (FLO1), the user-specified information storage apparatus ML searches for a user name i, that is, user ID corresponding to the B, and if the user name i is stored, the user name i is transmitted to the opener apparatus MO through the communication apparatus (FLO2). If the user name i is not stored, a message indicating that the user name i is not stored is noticed to the opener apparatus MO.

The opener apparatus MO receives the response from the user-specified information storage apparatus ML (FOO5). If the response from the user-specified information storage apparatus ML includes the user name i, the user name i is output, and the apparatus is stopped (FOO6 and FOO7). If the response does not include the user name i, a message indicating that there is no user name i is output, and the apparatus is stopped.

In addition, in the embodiment, the opener apparatus MO outputs the user name I (or the message indicating that there is no user name i). However, the user-specified information storage apparatus ML may output the user name i (or the message indicating that there is no user name i).

Next, the encrypting key pair generating procedure is described with reference to FIG. 9.

Firstly, the user-specified information storage apparatus M reads Lκ (SOG1). The user-specified information storage apparatus M selects at random $y \in Z_q$ (SOG2), sets $Q\_1 = yP$ (SOG3), and selects at random $Q\_2 \in G$ (SOG4). Next, (P, Q\_1, Q\_2) is set to a public key (SOG5), and y is set to a secret key (SOR6).

The encrypting procedure is described with reference to FIG. 9

Firstly, the user apparatus MU reads $\kappa$ and the encrypting key pair epk (FOG1) and selects at random $\rho \in Zq$ (FOG2). Next, (G', H'', H'_1, H'_2)=($\rho$G, B+$\rho$H_1, B+$\rho$H_2) is calculated (FOG3), and a cipher text (G', H'_1, H'_2) is output (FOG4)

The decrypting procedure is described with reference to FIG. 9.

Firstly, the opener apparatus MO reads the encrypting key pair (epk, esk) (FOD1), calculates M=G'-xH_1' (FOD2), and outputs a plain text M (FOD3).

Figure 10:
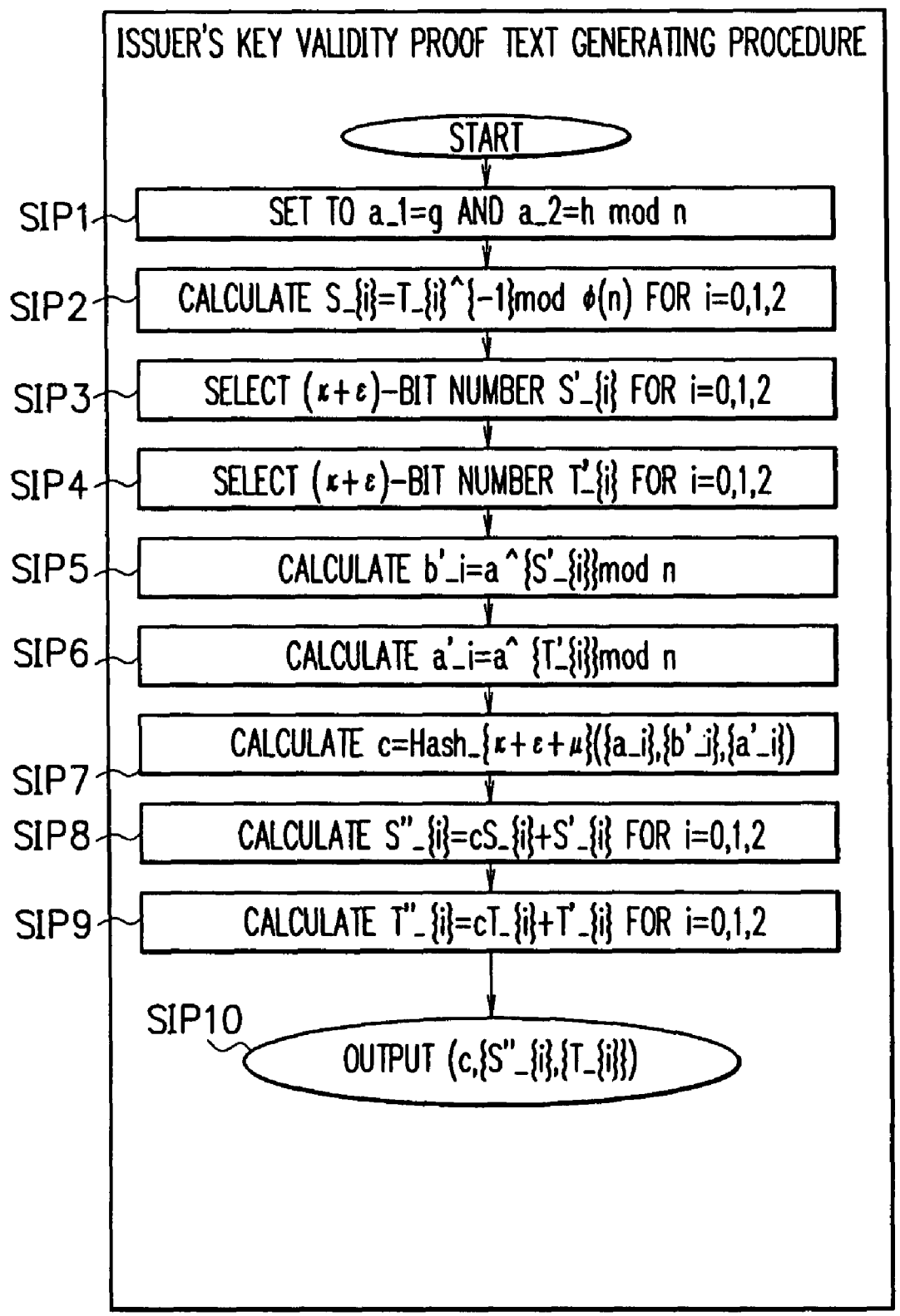
FIG. 10 is a flowchart of processes of the group signature scheme according to a first exemplary embodiment of the present invention.

The issuer's key validity proof text generating procedure is described with reference to FIG. 10.

The issuer apparatus MI sets a_1=g and a_2=hmodn (SIP1) and calculates $S_{\{i\}}=T_{\{i\}}^{\{-1\}} \bmod \phi(n)$ for i=0, 1, and 2 (SIP2). Next, the issuer apparatus MI selects ($\kappa+\epsilon$)-bit numbers S'_{i} for i=0, 1, and 2 (SIP3) and selects ($\kappa+\epsilon$)-bit numbers T'_{i} for i=0, 1, and 2 (SIP4). Next, $b'_i = a^{\{S'_{\{i\}}\}} \bmod n$, $a'_i = a_i^{\{T'_{\{i\}}\}} \bmod n$, and c=Hash_{$\kappa+\epsilon+\mu$}{a_i}, {b'_i}, {a'_i}) are calculated (SIP5, SIP6, and SIP7).

Next, the issuer apparatus MI calculates S''{i}=cS_{i}+ S'_{i} and T''_{i}=cT_{i}+T'_{i} for i=0, 1, and 2 (SIP8 and SIP) and outputs (c, {S''_{i}}, {T_{i}}) (SIP10).

Figure 11:
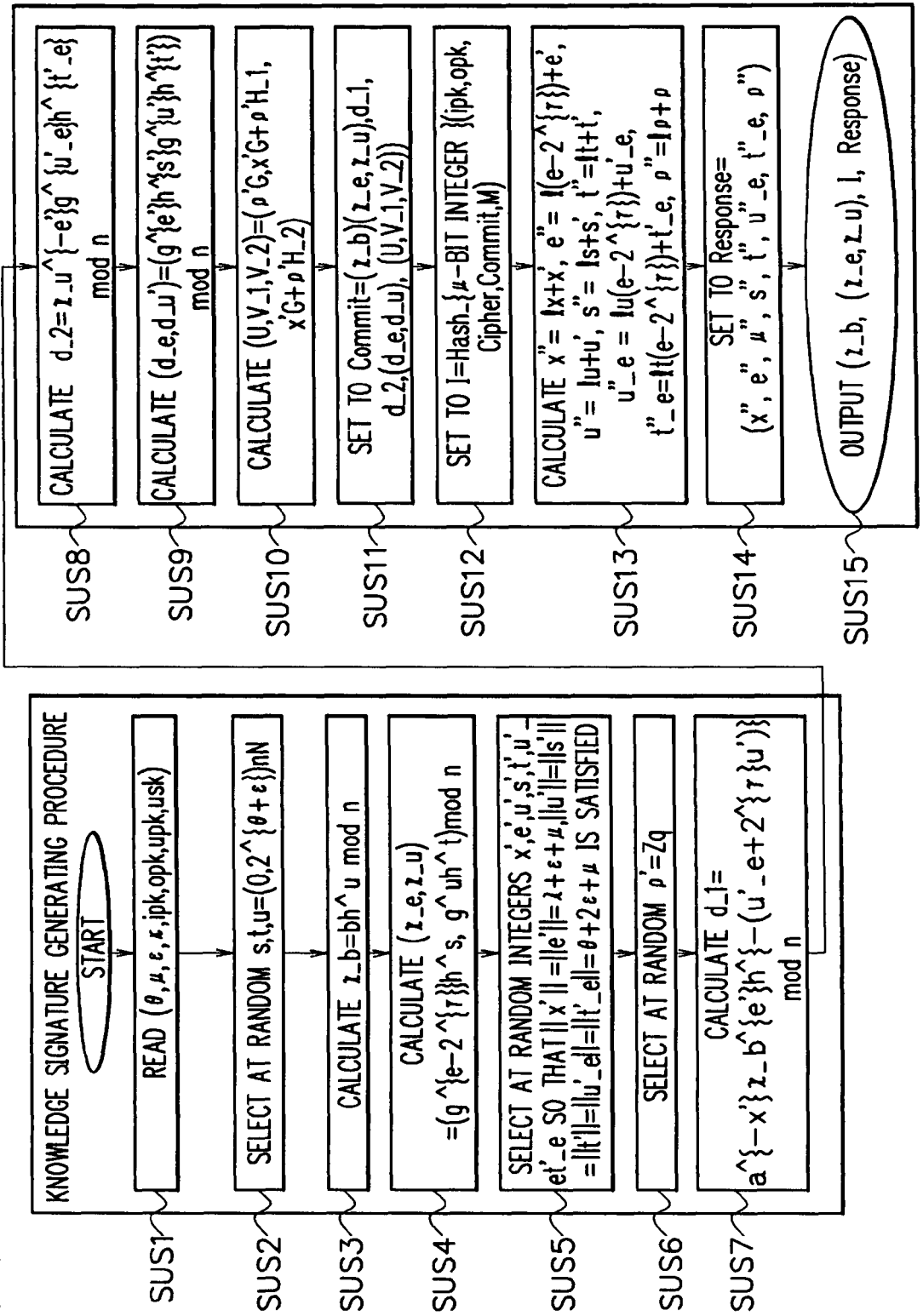
FIG. 11 is a flowchart of processes of the group signature scheme according to a first exemplary embodiment of the present invention.

The knowledge signature generating procedure SUS is described with reference to FIG. 11.

Firstly, the user apparatus MU reads ($\theta$, $\mu$, $\epsilon$, $\kappa$, issuer's public key ipk, opener public key opk, public key upk, secret key usk) (SUS1), selects s, t, and $u \in (0, 2^{\{\theta+\epsilon\}}) \cap N$ (SUS2), and calculates $\chi_b = b h^u \bmod n$ (SUS3). Next, ($\chi_e$, $\chi_u$)= $(g^{\{e-2^{\{\gamma\}}\}} h^s, g^u h^t) \bmod n$ is calculated (SUS4), and integers x', e', u', s', t', u'_e, and t'_e that satisfy $||x''||=||e''||=\lambda+\theta+2\epsilon+\mu$ are selected at random (SUS5). Next, $\rho' \in Zq$ is selected at random (SUS6), and $d_1 = a^{\{-x'\}} \chi_b^{\{e'\}} h^{\{-(u'_e + 2^{\{\gamma\}} u')\}} \bmod n$ is calculated (SUS7), $d_2 = \chi_u^{\{-e''\}} g^{\{u'_e\}} h^{\{t'_e\}} \bmod n$ is calculated (SUS8), and (d_e, d_u)= $(g^{\{e'\}} h^{\{s'\}}, g^{\{u'\}} h^{\{t'\}}) \bmod n$ is calculated (SUS9). Next, (U, V_1, V_2)=($\rho$'G, x'G+$\rho$'H_1, x'G+$\rho$'H_2) is calculated (SUS10), and Commit=($\chi_b$, ($\chi_e$, $\chi_u$), d_1, d_2, (d_e, d_u), (U,V_1, V_2)) is set (SUS11). Next, 1=Hash_{$\mu$-bit integer}{issuer's secret key ipk, opener public key opk, Cipher, Commit, M} is set (SUS12). Next, x''=1x+x', e''=1(e-$2^{\{y\}}$)+e', u''=1u+u', s''=1s+s', t''=1t+t', u''_e=1u(e-$2^{\{\gamma\}}$)+e'+u'_e, t''_e=1t(e-$2^{\{\gamma\}}$)+t'_e, and $\rho$''=1$\rho$+$\rho$' are calculated (SUS13). Next, Response=(x'', e'', u'', s'', t'', u''_e, t''_e, $\rho$'') is set (SUS14), and Signature=(($\chi_b$, ($\chi_e$, $\chi_u$)), 1, Response) is output (SUS15).

Figure 12:
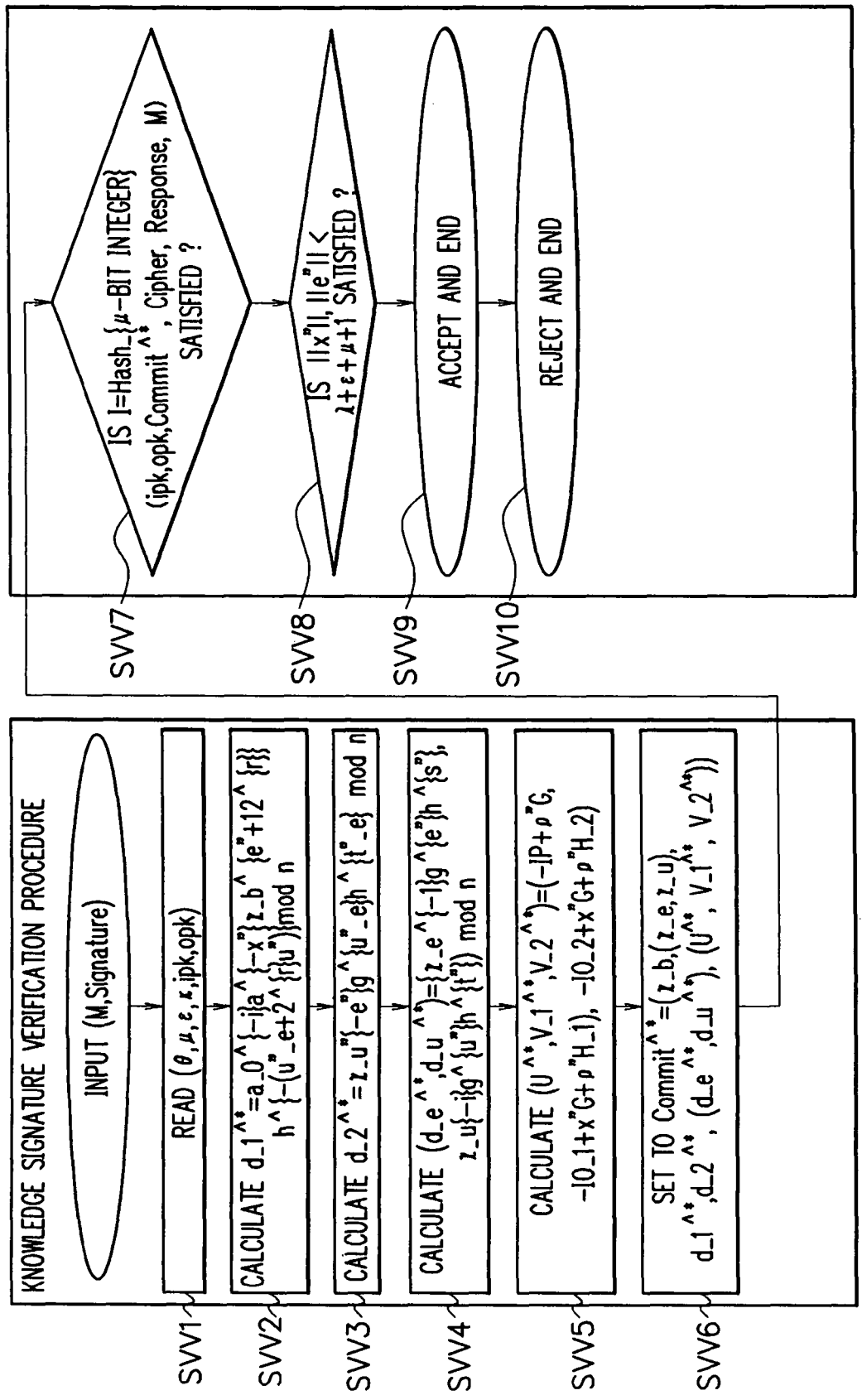
FIG. 12 is a flowchart of processes of the group signature scheme according to a first exemplary embodiment of the present invention.

The knowledge signature verification procedure is described with reference to FIG. 12.

When (M, Signature) is input, the verifying apparatus MV reads ($\theta$, $\mu$, $\epsilon$, $\kappa$, issuer's public key ipk, opener public key opk) (SVV1). Here, Signature=(Cipher, ($\chi_b$, ($\chi_e$, $\chi_u$)), 1, Response), Cipher=(G', H'_1, H'_2), and Response=(x'', e'', u'', s'', t'', u''_e, $\rho$''). Next, the verifying apparatus MV calculates $d_1^* = a_0^{\{-1\}} a^{\{-x''\}} \chi_b^{\{e + 12^{\{\gamma\}}\}} h^{\{-(u''_e + 2^{\{\gamma\}} u'')\}} \bmod n$ (SVV2). Next, $d_2^* = \chi_u^{\{-e''\}} g^{\{u''_e\}} h^{\{t''_e\}} \bmod n$ is calculated (SVV3). Next, (d_e*, d_u*)=($\chi_e^{\{-1\}} g^{\{e''\}} h^{\{s''\}}$, $\chi_u^{\{-1\}} g^{\{u''\}} h^{\{t''\}}) \bmod n$ is calculated (SVV4). Next, (U*, V_1*, V_2*)=(-1P+$\rho$''G, -1Q_1+x''G+$\rho$''H_1), -1Q_2+ x''G+$\rho$''H_2) is calculated (SVV5). Next, Commit*=($\chi_b$, ($\chi_e$, $\chi_u$), d_1*, d_2*, (d_e*, d_u*), (U*, V_1*, V_2*)) is set (SVV6).

Next, the verifying apparatus MV checks whether or not 1=Hash_{$\mu$-bit integer}{issuer's public key ipk, opener public key opk, Commit*, Cipher, Response, M) is satisfied (SVV7). If not satisfied, the verifying apparatus outputs Reject i(SVV10). Finally, the verifying apparatus MV checks whether or not $||x''||$, $||e''|| < \lambda + \epsilon + \mu + 1$ is satisfied (SVV8). If satisfied, Accept is output (SVV9), and if not satisfied, Reject is output (SVV10).

Figure 13:
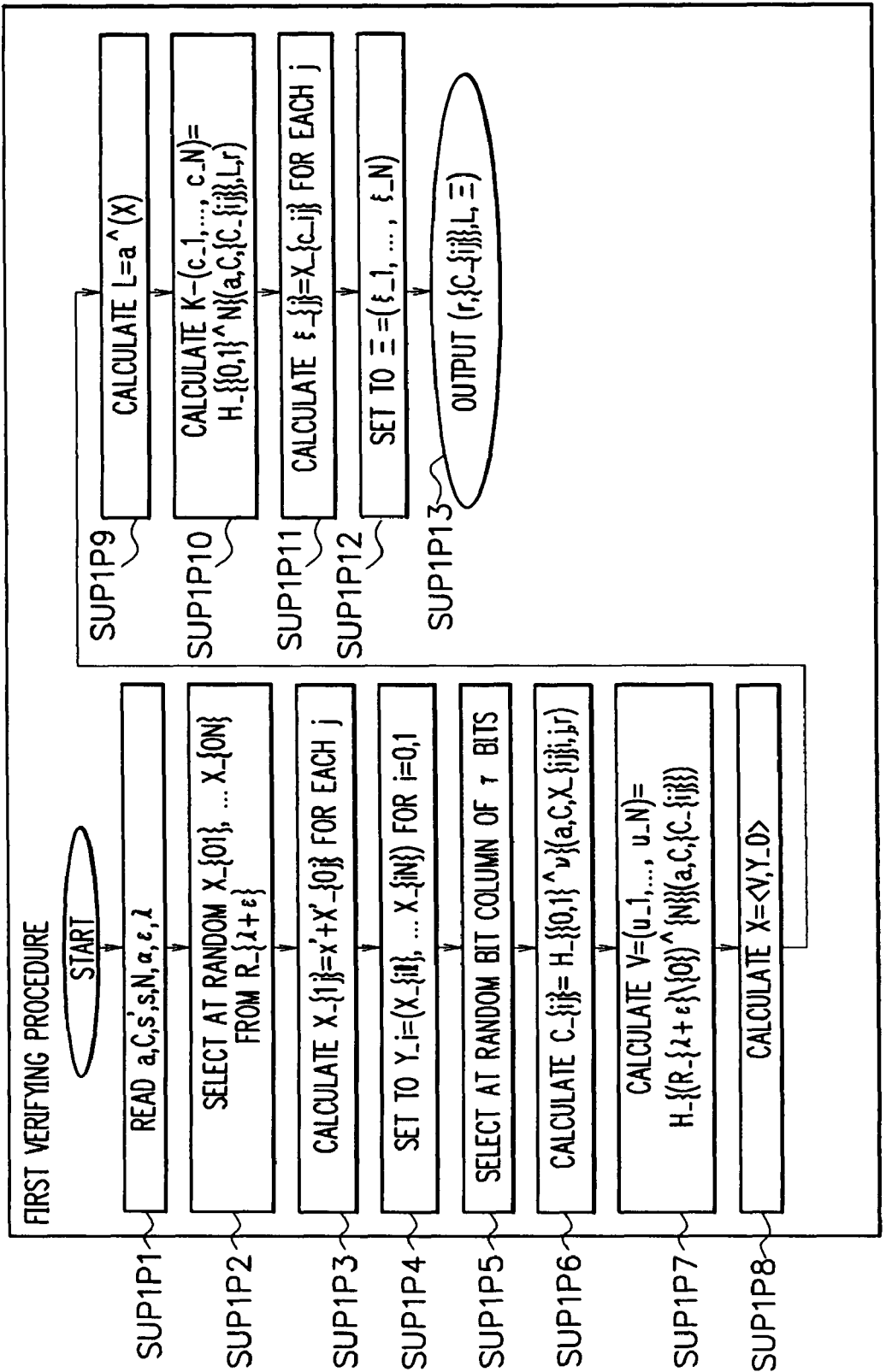
FIG. 13 is a flowchart of processes of the group signature scheme according to a first exemplary embodiment of the present invention.

Next, a first proving procedure which proves the validity of C in a straight-line extractable manner is described with reference to FIG. 13. Detailed procedure for proving the validity in the straight-line extractable manner are disclosed in Non-Patent Document 10.

There are several straight-line extractable validity proving methods. Any one thereof may used, and the present invention is not limited to the later-described method.

The N and v are set to security parameters. The i-th component of a vector a is denoted by a_i. An inner product is denoted by $\langle ., . \rangle$. That is, an inner product of vectors a and b is represented by $\langle a, b \rangle = a_1 b_1 + \ldots + a_N b_N$. In addition, $R_{\{\lambda+\epsilon\}} = Z \cap [0, 2^{\{\lambda+\epsilon\}}]$ is satisfied. An X-value hash function of a set X is denoted by $H_X$.

Firstly, the user apparatus MU reads a, C, x', a portion n of issuer public key ipk, and N, v, $\epsilon$, $\lambda$ (SUP1P1) and selects at random X_{01}, . . . , X_{0N} from $R_{\{\lambda+\epsilon\}}$ (SUP1P2). Next, X_{1j}=x'+X_{0j} for each j is calculated (SUP1P3), and Y_i=(X_{i1}, . . . , X_{iN}) for i=0 and 1 is obtained (SUP1P4). Next, a bit column r of v bits is selected at random (SUP1P5), and $C_{\{ij\}} = H_{\{\{0, 1\}^v\}}\{a, C, X_{\{ij\}}, i, j, r\}$ is calculated (SUP1P6). Next, V=(u_1, . . . , u_N)=H_{$\{(R_{\{\lambda+\epsilon\}} \setminus \{0\})^{\{N\}}\}}$(a, C, {C_{ij}}) is calculated (SUP1P7). Next, X=$\langle$V, Y_0$\rangle$ is calculated (SUP1P8), $L = a^{\{X\}}$ is calculated (SUP1P9), K=(c_1, c_N)=H_{$\{\{0, 1\}^N\}}$(a, C, {C_{iu}}, L, r) is calculated (SUP1P10), and $\xi_{\{j\}} = X_{\{c_{jj}\}}$ for each j is calculated (SUP1P11). Here, $\Xi = (\xi_1, \ldots, \xi_\lambda)$ is obtained (SUP1P12), and finally, a signature text (r, {C_{ij}}, L, $\Xi$) is output (SUP1P13).

Figure 14:
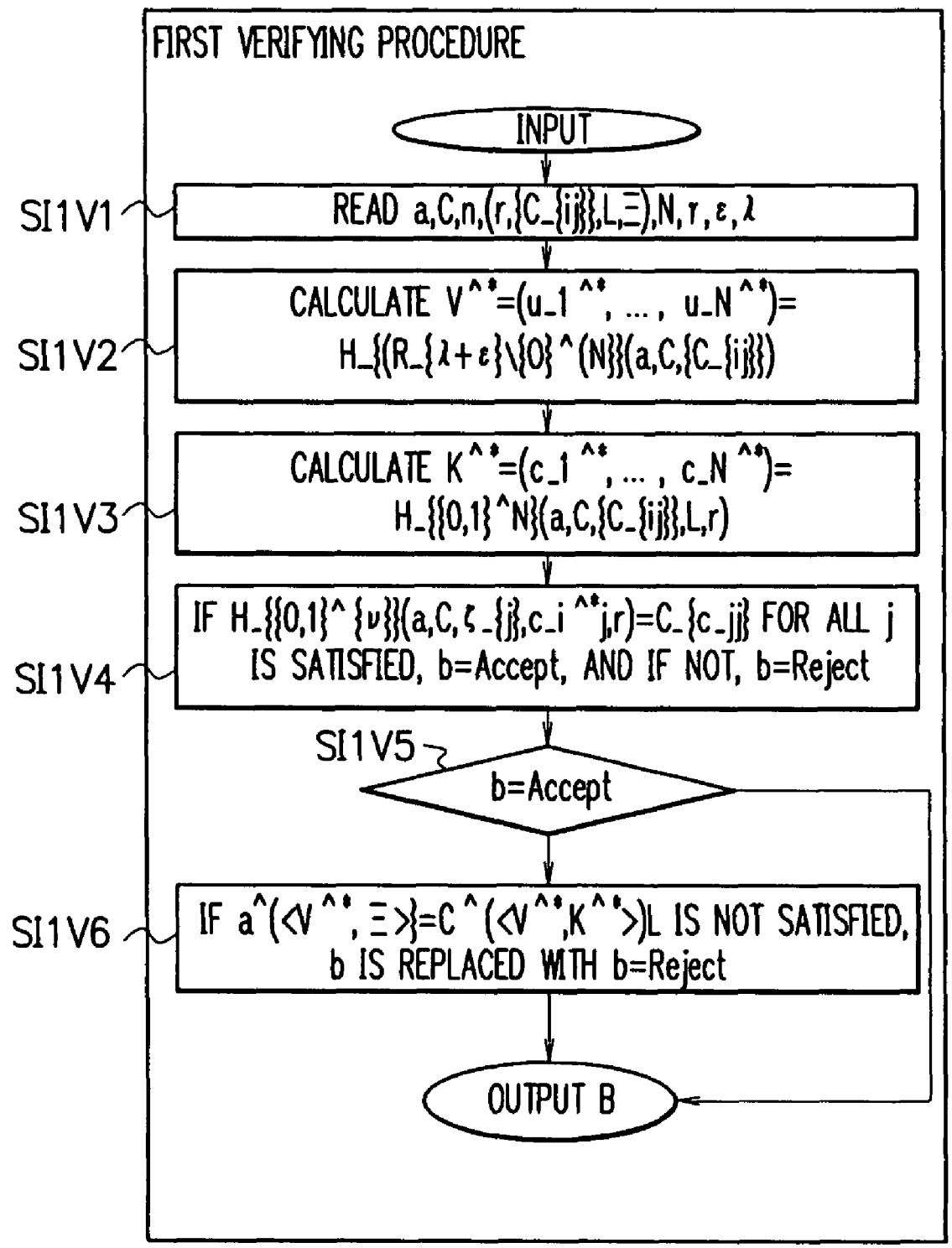
FIG. 14 is a flowchart of processes of the group signature scheme according to a first exemplary embodiment of the present invention.

Next, detailed processes of the first verifying unit are described with reference to FIG. 14.

Firstly, the issuer apparatus MI reads (a, C, n, (r, {C_{ij}}, L, $\Xi$), N, v, $\epsilon$, $\lambda$) (SI1V1), and V^*=(u_1^*, . . . , u_N^*)=H_{$\{(R_{\{\lambda+\epsilon\}} \setminus \{0\})^{\{N\}}\}}$(a, C, {C_{ij}}) is calculated (SI1V2). Next, K^*=(c_1^*, . . . , c_N^*)=H_{$\{\{0, 1\}^N\}}$(a, C, {C_{ij}}, L, r) is calculated (SI1V3). Next, it is determined whether or not H_{$\{\{0, 1\}^v\}$}(a, C, $\xi_{\{j\}}$, c_j^*, j, r)=C_{c_jj} for all j is satisfied. If satisfied, b=Accept is designated, and if not, b=Reject is designated (SI1V4). It is determined whether or not the b is Accept (SI1V5), and if the b is Reject, the b is output. If the b is Accept, the issuer apparatus MI checks whether or not $g^{\{\langle V^*, \Xi \rangle\}} = h^{\{V^*, K^*\}} L$ is satisfied. If the $a^{\{\langle V^*, \Xi \rangle\}} = h^{\{\langle V^*, K^* \rangle\}} L$, is not satisfied, the b is updated to Reject (SI1V6), and the b is output.

The interval proving procedure SUIP and the interval verifying procedure SIIV are described.

As described above, the interval proving procedure SUIP generates the validity proof text ProofI#[C] that proves that the discrete logarithm x' with the a of C as a base is included in the interval $\Lambda$, and the interval verifying procedure SIIV verifies the validity of the ProofI#[C].

The interval proving procedure SUIP and the interval verifying procedure SIIV may use any proof verification method of proving that a discrete logarithm is included in a predetermined interval. Such a proof verification method is disclosed in Non-Patent Document 11.

Detailed processes of the second proving procedure SU2P are described with reference to FIG. 15.

Firstly, ($\beta$, B, x, issuer's public key ipk, opener public key opk) is read (SU2P1), and ($\lambda+\mu+\epsilon$)-bit integer x' is selected at random (SU2P2). Next, $\beta' = \beta^{\{x'\}} \bmod n$ and $B' = B^{\{x'\}}$ are calculated (SU2P3), and $c=H\_\{\{0, 1\}^\mu\}(\beta', B', \beta, B, x,$ issuer's public key ipk, opener public key opk) is calculated (SU2P4). In addition, $X=cx+x'$ is calculated (SU2P6), and finally, $(\beta', B', X)$ is output (SU2P6).

Detailed processes of the second verifying procedure SI2V are described with reference to FIG. 15.

Firstly, the issuer apparatus MI reads $((\beta', B', X),$ issuer's public key ipk, opener public key opk) (SI2V1) and calculates $c=H\_\{\{0, 1\}^\mu\}(\beta', B', \beta, B, x,$ issuer's public key ipk, opener public key opk) (SI2V2). Next, it is checked whether or not $V \leq \lambda+\mu+\epsilon$ (bits) is satisfied (SI2V3), and if not, Reject is output (SI2V6). If $X \leq \lambda+\mu+\epsilon$ is satisfied, it is checked whether or not $a^X=\beta^c\beta'$modn and $XG=cB+B'$ are satisfied (S12V4). If satisfied, Accept is output (S12V5), and if not, Reject is output (S12V6).

[Second Exemplary Embodiment]

A construction of an apparatus according to the embodiment is the same as that of the first exemplary embodiment except for the signature unit FUS and the verifying unit FVV.

Similarly to the signature unit FUS according to the first exemplary embodiment, the signature unit FUS generates Commit, 1, and Response. Next, (Commit, Response) is set to the signature text.

Figure 16:
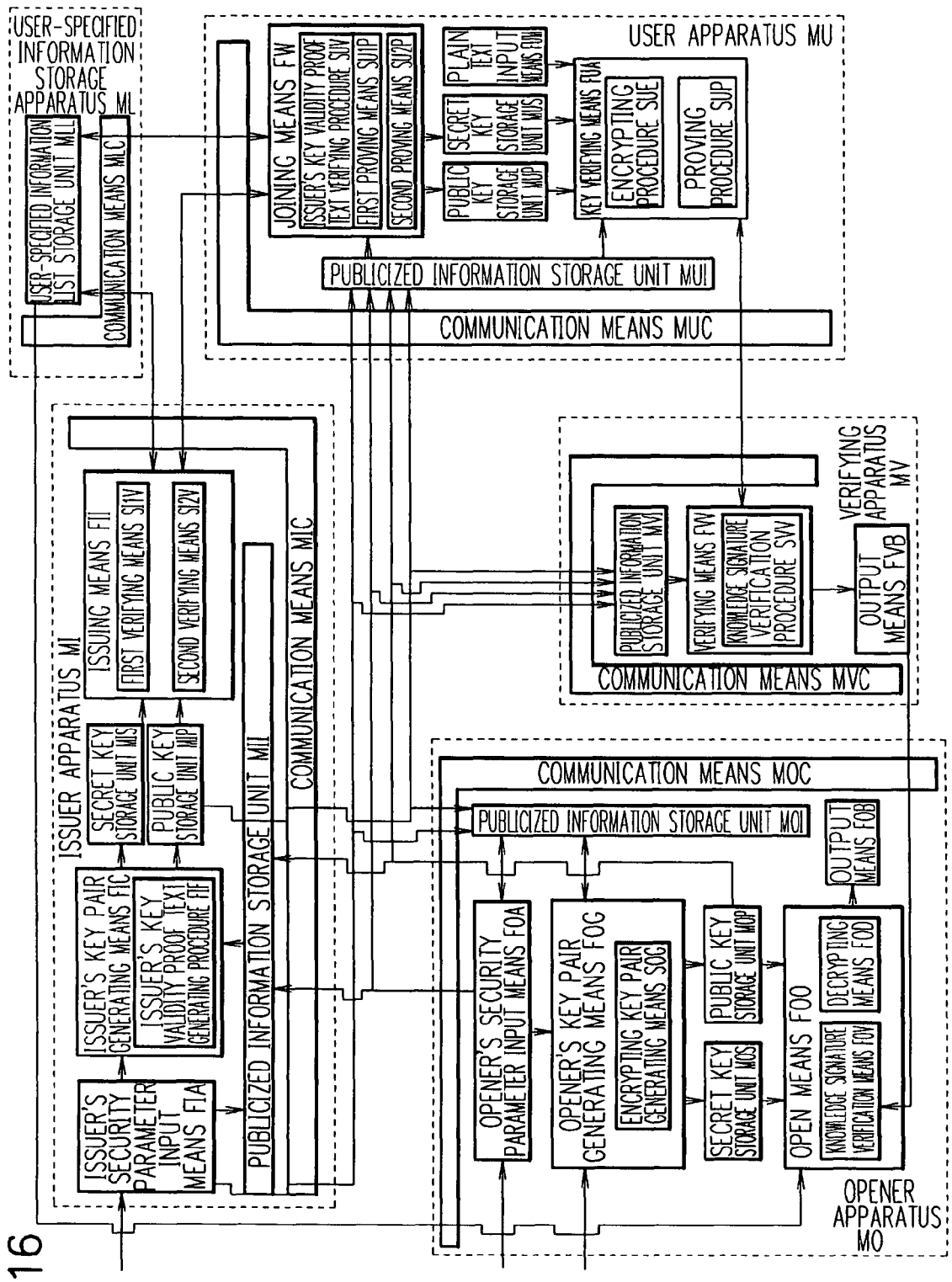
FIG. 16 is a flowchart of processes of the group signature scheme according to a second exemplary embodiment of the present invention.
Figure 19:
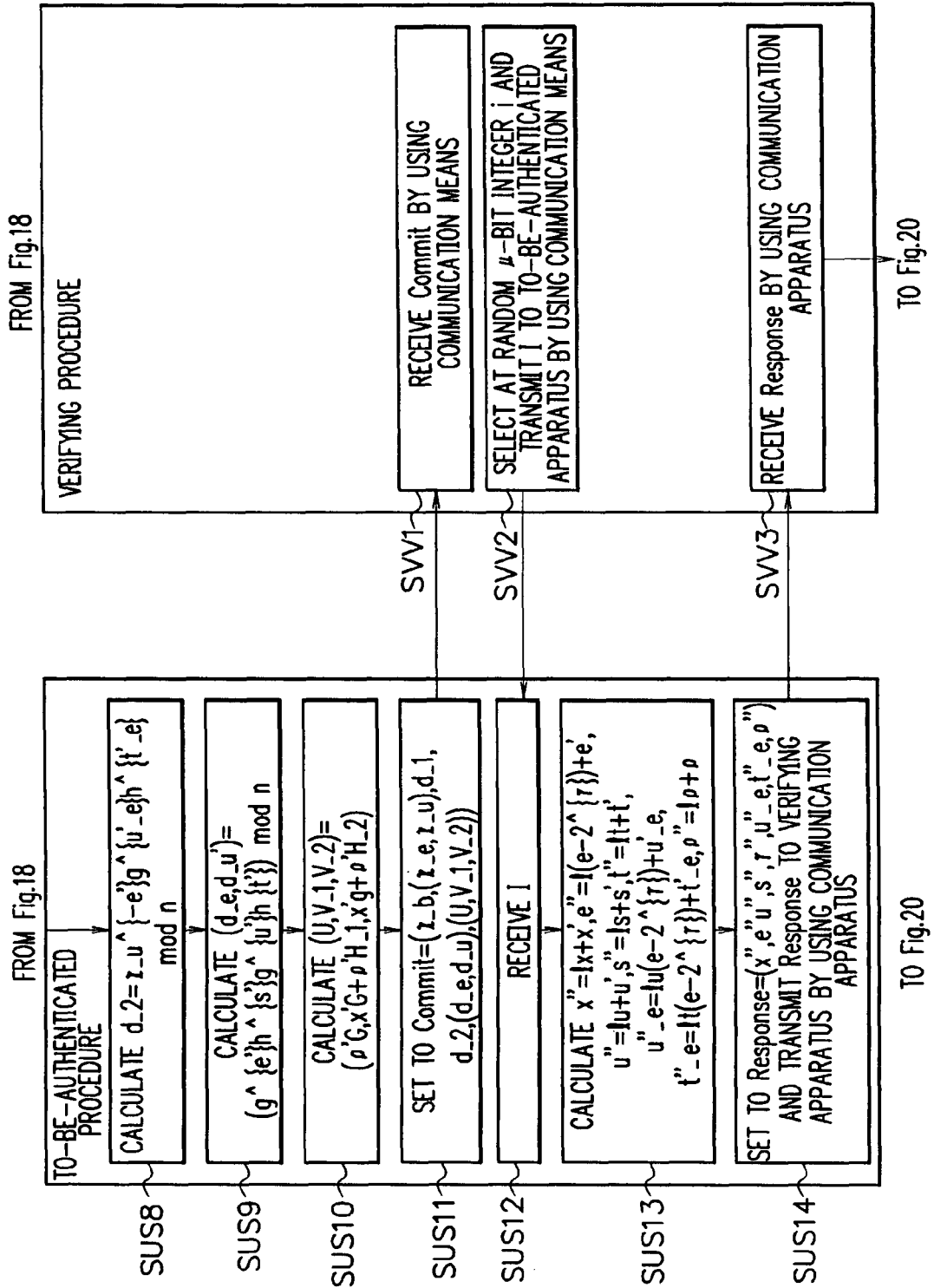
FIG. 19 is a flowchart of processes of the group signature scheme according to a third embodiment of the present invention.
Figure 20:
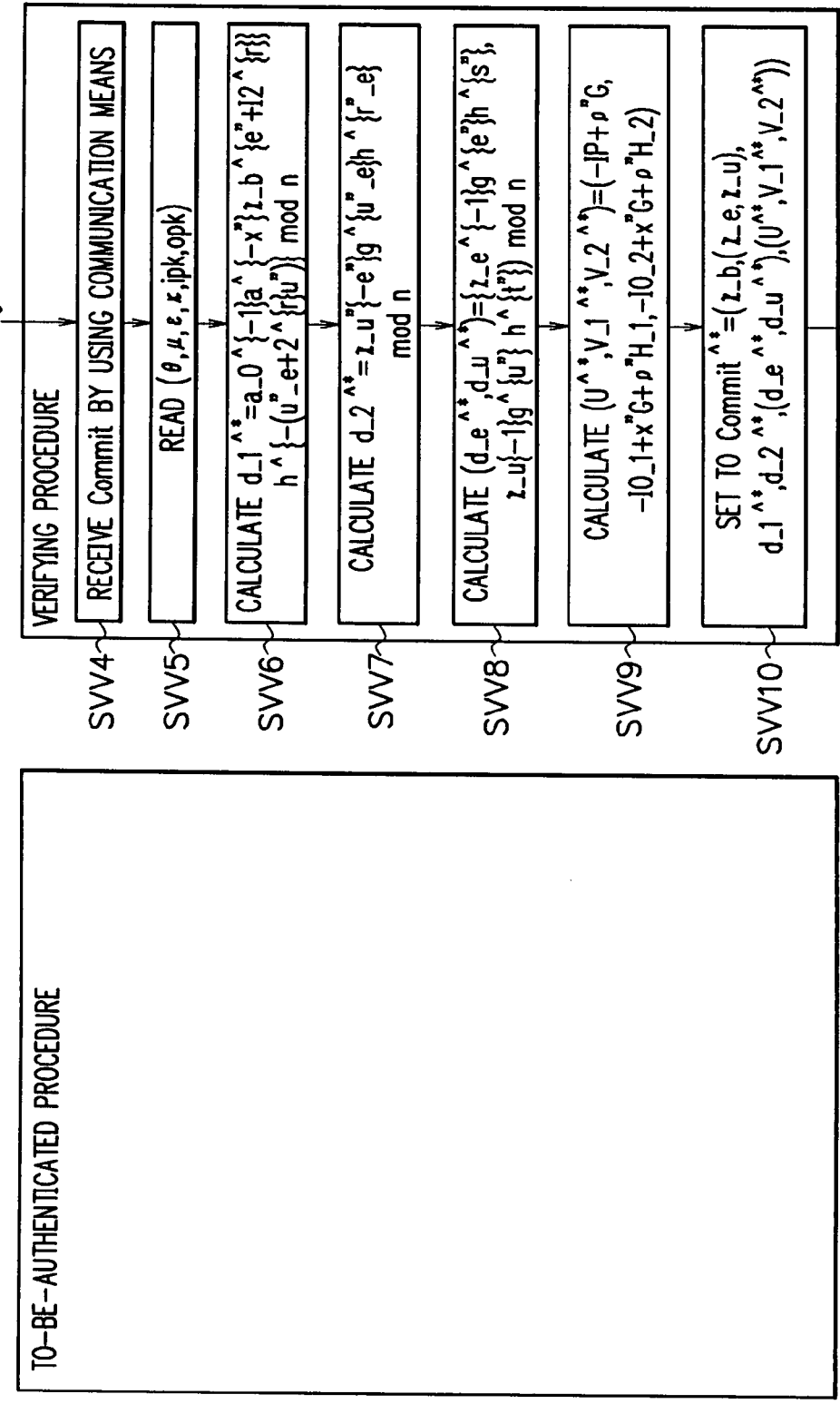
FIG. 20 is a flowchart of processes of the group signature scheme according to a third embodiment of the present invention.
Figure 21:
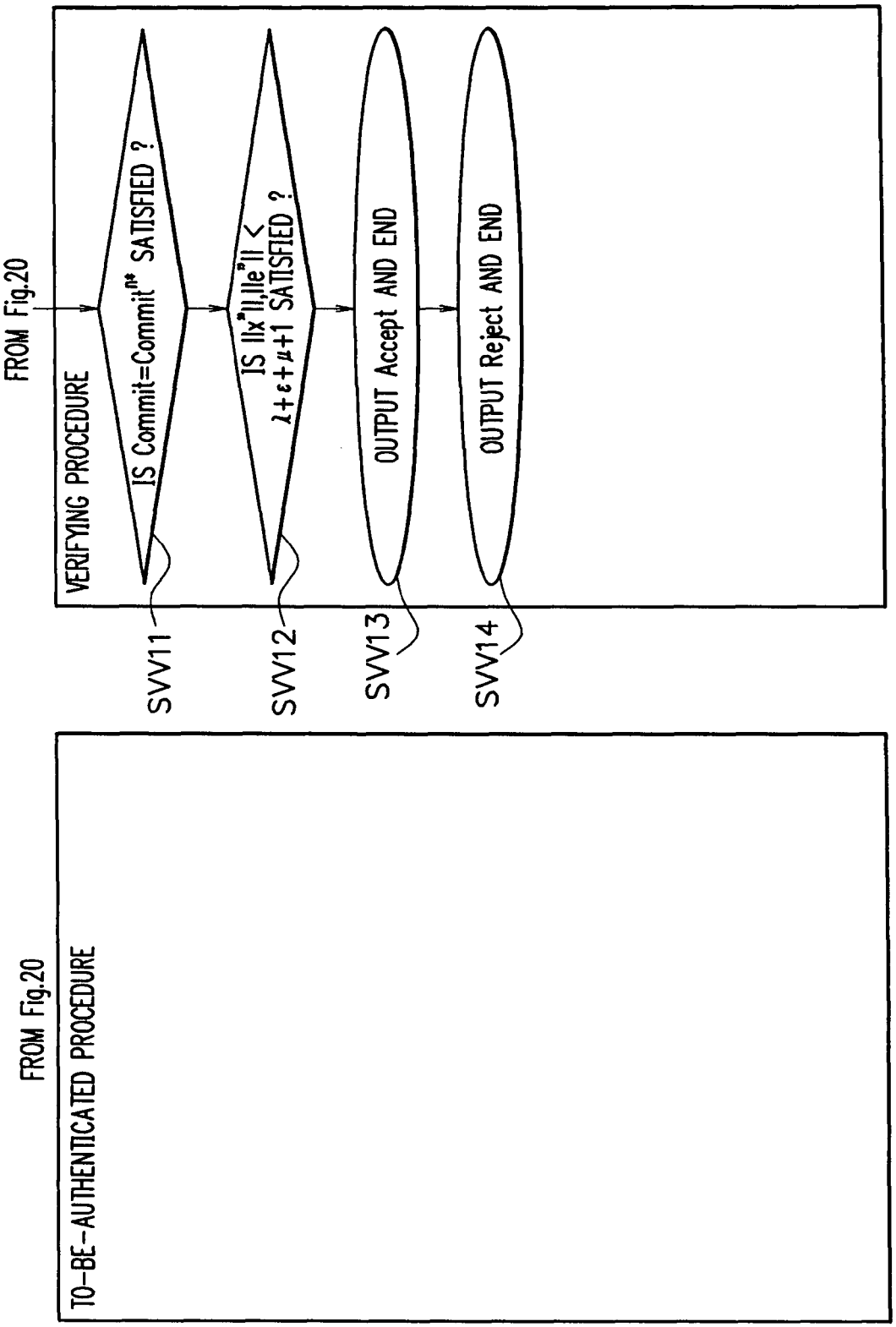
FIG. 21 is a flowchart of processes of the group signature scheme according to a third embodiment of the present invention.

Processes of the verifying unit FVV are described with reference to FIG. 16. When (M, Signature) is input, the verifying apparatus MV reads $(\theta, \mu, \epsilon, \kappa,$ issuer's public key ipk, opener public key opk) (SVV1). Here, Signature=(Cipher, Commit, Response), Cipher=(G', H'\_1, H'\_2), Commit= $(\chi\_b, (\chi\_e, \chi\_u), d\_1, d\_2, (d\_e, d\_u), (U, V\_1, V\_2))$, and Response=$(x'', e'', u'', s'', t'', u''\_e, t''\_e, \rho'')$.

Firstly, the verifying unit FVV calculates $1=\text{Hash}\_\{\mu\text{-bit integer}\}$(issuer's public key ipk, opener public key opk, Cipher, Commit, M) by using Commit which is a portion of the signature text (SVV2). Next, processes which are the same as SVV2 to SVV6 of the verifying unit FVV (see FIG. 12) according to the first exemplary embodiment are performed by using 1 to calculate Commit^* (SVV3 to SVV7). Next, it is checked whether or not the calculated Commit^* is equal to the Commit^* that is a portion of the signature text, and if not, Reject is output (SVVS). If the calculated Commit^* is equal to the Commit^* that is a portion of the signature text, processes which are the same as SVV8 and the following processes of the verifying unit FVV according to the first exemplary embodiment are performed to check whether or not $||x'||, ||e'''||<\lambda+\epsilon+\mu+1$ is satisfied (SVV9). If satisfied, Accept is output (SVV10), and if not, Reject is output (SVV11).

[Third Exemplary Embodiment]

In the embodiment, an Identity Escrow scheme is implemented. The Identity Escrow scheme is disclosed in Non-Patent Document 12.

A construction of an apparatus according to the embodiment is similar to that of the first exemplary embodiment (see FIG. 17). However, the signature unit FUS is replaced with a to-be-authenticated unit FUA, and the signature generating procedure SUS is replaced with a proving procedure SUP. In addition, the verifying unit SUV according to the first exemplary embodiment is different from the verifying unit SUV according to third exemplary embodiment. The to-be-authenticated unit FUA and the verifying unit SUV communicate with each other to perform calculations. Unlike the first exemplary embodiment, the user apparatus MU does not include a unit FOB for outputting a signature.

Detailed processes of the to-be-authenticated unit FUA and the verifying unit SUV are described. Firstly, the user apparatus MU performs an encrypting procedure SUE by using the same method as the knowledge signature unit according to the first exemplary embodiment to generate a cipher text Cipher of B (see FIG. 9).

Next, the user apparatus MU performs the proving procedure SUP, and the verifying apparatus performs processes of the verifying unit SVV. The proving procedure SUP and the verifying unit SVV are described with reference to FIGS. 18 to 21.

Firstly, the user apparatus MU calculates Commit=$(\chi\_b, (\chi\_e, \chi\_u), d\_1, d\_2, (d\_e, d\_u), (U, V\_1, V\_2))$ by using the same methods as SUS2 to SUS 11 of the signature unit FUS (see FIG. 11) according to the first exemplary embodiment (SUS2 to SUS11).

Next, the user apparatus MU transmits the Commit to the verifying apparatus MY by using the communication apparatus (SUS12). When the Commit is received (SVV1), the verifying apparatus MV selects at random $\mu$-bit integer 1 and transmits the 1 to the user apparatus by using the communication apparatus (SVV2).

When the 1 is received (SUS13), the user apparatus MU calculates Response by using the 1 in the same method as SUS14 of the signature unit FUS (see FIG. 11) according to the first exemplary embodiment and transmits the Response to the verifying apparatus MV by using the communication apparatus (SUS14 and SUS15).

When the Response is received, the verifying apparatus MV performs the calculations which are the same as those of SVV1 to SVV6 of the verifying unit FVV (see FIG. 12) according to the first exemplary embodiment by using the Response and $\chi\_b, (\chi\_e, \chi\_u)$ to calculate Commit^* (SVV5 to SVV10).

Next, the verifying apparatus MV checks whether or not Commit=Commit^* is satisfied (SVV11), and if not, Reject is output (SVV14). If Commit=Commit^* is satisfied, the process of SVV8 and the following processes of the verifying apparatus MV(see FIG. 12) according to the first exemplary embodiment are performed.

Namely, it is determined whether or not $||x'||, ||e'||<\lambda+\epsilon+\mu+1$ is satisfied (SVV12). If satisfied, Accept is output (SVV13), and if not, Reject is satisfied (SVV14).

[Fourth Exemplary Embodiment]

The embodiment is the same as the first exemplary embodiment except for the first proving unit SU1P and the first verifying procedure SI1V. As described in the first exemplary embodiment, any straight-line extractable proving method may used for the first proving procedure SU1P. However, in the embodiment, a straight-line extractable proving method different from that of the first exemplary embodiment is used.

Processes of the first proving unit SU1P are described with reference to FIG. 22.

The N and v are set to security parameters.

Firstly, the user apparatus MU reads $(a, C, x', n, N, v, \epsilon, \lambda)$ (SUP1P1), and $(\lambda+\epsilon)$-bit integer $X\_\{0j\}$ for $j=1, \ldots, N$ is selected at random (SUP1P2). Next, $X\_\{1j\}=x'+X\_\{0j\}$ for $j=1, \ldots, N$ is selected at random (SUP1P3). Next, $\epsilon$-bit integer $r\_\{ij\}$ for $i=0, 1$ and $j=1, \ldots, N$ is selected at random (SUP1P4).

Next, $C\_\{ij\}\}=\text{Hash}\_\{\{0, 1^v\}(a, C, X\_\{ij\}, r\_\{ij\})$ for $j=1, \ldots, N$ is calculated (SUP1P5), and $L\_\{j\}=a^\{X\_\{0j\}\}$modn for $j=1, \ldots, N$ is calculated (SUP1P6).

Next, $c\_j=\text{Hash}\_\{\{0, 1\}\}(a, C, L\_\{j\}, j)$ for $j=1, \ldots, N$ is calculated (SUP1P7), and $\xi\_\{j\}=X\_\{c\_jjj\}$ for $j=1, \ldots, N$ is set (SUP1P8). Finally, a proof text $(\{C\_\{ij\}\}, \{c\_j\}, \{\xi\_\{j\}\})$ is output (SUP1P9).

The first verifying procedure SI1V is described with reference to FIG. 22.

Firstly, the issuer apparatus MI reads (a, C, n, ({$C\_\{ij\}$}, {$\xi\_\{j*\}$}) (SI1V1), and $L\_\{j\}^{\wedge*} = a^{\wedge}(\xi\_\{j\})C^{\wedge}\{-c\_j\})$ for j=1, ..., N is calculated (SI1V2).

Next, it is checked whether or not $c\_j$=Hash_{{0, 1}} (a, C, $L\_\{j\}^{\wedge*}$, j) for j=1, ..., N is satisfied (SI1V3). Next, if $c\_j$=Hash_{{0, 1}}(a, C, $L\_\{j\}^{\wedge*}$, j) for all j=1, ..., N is satisfied, Accept is output (SI1V4), and if not, Reject is output (SI1V5).

In addition, similarly to the first proving unit SU1P according to the first exemplary embodiment, any straight-line extractable proving unit may be used as the first proving unit SU1P according to the second and third exemplary embodiments. Therefore, the first proving unit SU1P and the first verifying procedure SI1V according to the second and third exemplary embodiments may be replaced with the first proving unit SU1P and the first verifying procedure SI1V according to the fourth exemplary embodiment.

The invention claimed is:

1. A group signature process of a proving apparatus, comprising:
    reading, using a computing device, a data required for calculation;
    when N is set to one of security parameters and a knowledge of a discrete logarithm of (a, C) is proven, selecting at random N integers $X\_\{[[1]]0j\}$ and calculating $X\_\{1j\}$ for each j by using secret information x' and $X\_\{0j\}$;
    selecting $r\_\{ij\}$ for each j and calculating a hash value $C\_\{ij\}$ of a data including the $X\_\{ij\}$ and the $r\_\{ij\}$;
    calculating, using the computing device, $L\_\{j\}$ for each j by raising the a to the power $X\_\{0j\}$;
    selecting a challenge $c\_j$ for each j and setting $\xi\_\{j\}$ for each j to the $X\_\{c\_jj\}$; and
    outputting a data including the {$C\_\{ij\}$} and the {$\xi\_\{j\}$}, where i is 0 or 1.

2. A group signature process of a verifying apparatus, comprising:
    reading, using a computing device, a data required for calculation;
    when a knowledge of a discrete logarithm of (a, C) is proven, acquiring a challenge $c\_j$ for each j;
    calculating, using the computing device, $L\_\{j\}^{\wedge*}$ by multiplying a value obtained by raising the C to the power a sign-inverted $c\_j$ with a value obtained by raising the a to the power a portion $\xi\_\{j\}$ of the input data;
    checking whether or not a hash value of a data including the $L\_\{j\}^{\wedge*}$ is equal to the challenge $c\_j$; and
    if the hash value of the data including the $L\_\{j\}^{\wedge*}$ is not equal to the challenge $c\_j$, outputting a message indicating that the proving of the knowledge of the discrete logarithm of the (a, C) is not valid.

3. A group signature scheme of a user apparatus which communicates with an issuer apparatus to generate a member secret key, a member public key, and user-specified information, comprising:
    a first step of reading, using a computing device, a required data including a public key of an issuer;
    a second step of generating at random, using the computing device, an integer x', calculating power residue, and transmitting a calculation results C of the power residue to the issuer apparatus;
    a third step of receiving a number x'' generated by the issuer apparatus, calculating x by using the x' and the x'', setting the x to the member secret key or a portion thereof, calculating at least two-times power residue, transmitting at least β of calculation results β and B of the two-times power residue to the issuer apparatus, and setting the B to the user-specified information, wherein the β is obtained by calculating the power residue using a portion G of the public key of the issuer apparatus as a base and the x as an exponent;
    a fourth step of receiving an integer e and an element b of a quadratic residue group with an RSA modulus from the issuer apparatus;
    a step of adding the (b, e) as the member public key or a portion thereof and outputting the member public key and the member secret key,
    wherein the power residue calculation is performed by setting a portion a of the public key of the issuer apparatus to a base and setting the x' to an exponent,
    wherein the B is calculated by using power residue with the a as a base and the x as an exponent,
    wherein the G is an element of a group of which order is publicized, and
    wherein the a is an element of a quadratic residue group with an RSA modulus.

4. The group signature scheme according to claim 3, wherein the second step comprises:
    a step of calculating a straight-line extractable validity proof text of the C and a proof text for proving that a discrete logarithm of the C with the a as a base is included in a predetermined interval; and
    a step of transmitting the C, the straight-line extractable validity proof text, and the proof text for proving that the discrete logarithm is included in the predetermined interval to the issuer apparatus, and
    wherein the third step comprises a step of generating a validity proof text of the (β, B) and transmitting the validity proof text of the (β, B) to the issuer apparatus.

5. The group signature scheme according to claim 4, wherein the step of generating the straight-line extractable validity proof text comprises:
    a step of reading a required data and selecting at random $X\_\{01\}$, ... $X\_\{0N\}$;
    a step of calculating $X\_\{1j\}$ for each j obtained by adding the x' to the $X\_\{0j\}$, selecting at random number r, calculating a hash value $C\_\{ij\}$ of a bit column including $X\_\{ij\}$ and r for each ij, and a hash value V of a bit column including the hash value $C\_\{ij\}$;
    a step of calculating an inner product X of the V and a vector of $X\_\{01\}$, ..., $X\_\{0N\}$;
    a step of generating $c\_1$, ..., $c\_N$ from hash values of a data including L obtained by raising the data a which is a portion of publicized information of an issuer to the power of X; and
    a step of outputting a data including r, {$C\_\{ij\}$}, L, and Ξ, as the straight-line extractable validity proof text, and
    wherein $X\_\{c\_jj\}$ is $\xi\_j$, and the $\epsilon\_1$, ..., $\xi\_N$ is the Ξ, where i is 0 or 1.

6. The group signature scheme according to claim 5, wherein the straight-line extractable validity proof text is generated.

7. A group signature scheme of an issuer apparatus for communicating with a user apparatus to generate a member secret key, a member public key, and a user-specified information, comprising:
    a first step of reading, using a computing device, a data including a public key and a secret key;
    a second step of generating at random, using the computing device, a number x'' and transmitting the x'' to the user apparatus; and
    a third step of calculating (b, e) by using a data received from the user apparatus or a portion β thereof, wherein the β is an element of a quadratic residue group with an RSA modulus n, wherein the e is selected at random, wherein the b is generated by raising the β to the power 1/e as a modulus of the n.

8. The group signature scheme according to claim 7, wherein the second step comprises:

receiving from the user apparatus a data C, a straight-line extractable validity proof text of the data C, and a proof text for proving that a discrete logarithm of the data C with a portion a of the public key of the issuer as a base is included in a predetermined interval; and verifying a validity of the straight-line extractable validity proof text and a validity of the proof text for proving that the discrete logarithm is included in the interval, and wherein the third step comprises:

receiving the data B and a validity proof text of the (β, B); and verifying a validity of the validity proof text of the (β, B).

9. The group signature scheme according to claim 8, the verifying of the validity of the straight-line extractable validity proof text comprises:

reading a required data including the straight-line extractable validity proof text;

generating $K=(c\_1, \ldots, C\_N)$ from a hash value of a data including $\{C\_\{ij\}\}$, L, and r, wherein the read straight-line extractable validity proof text includes r, $\{C\_\{ij\}\}$, L, and Ξ, and a hash value of a data including the $\{C\_\{ij\}\}$ is set to V; and accepting the validity proof text if $C\_\{\{c\_ij\}\}$ for all j is a hash value of a data including $c\_j$, $c\_j$, and r, wherein i is 0 or 1 and j is from 1 to N, and if a value obtained by raising a portion a of the public key of the issuer apparatus to the power of an inner product of V and Ξ is equal to a value obtained by multiplying L with a value obtained by raising the data C to the power of an inner product of V and K.

10. The group signature scheme according to claim 8, where the verifying of the straight-line extractable validity proof text is performed.

* * * * *